United States Patent
Hwang

Patent Number: 6,005,706
Date of Patent: Dec. 21, 1999

[54] THIN FILM ACTUATED MIRROR ARRAY IN AN OPTICAL PROJECTION SYSTEM

[75] Inventor: Kyu-Ho Hwang, Seoul, Rep. of Korea

[73] Assignee: Daewoo Electronics Co., Ltd., Seoul, Rep. of Korea

[21] Appl. No.: 09/050,935

[22] Filed: Mar. 31, 1998

[51] Int. Cl.$^6$ .................................................. G02B 26/00
[52] U.S. Cl. ........................ 359/291; 359/290; 359/292
[58] Field of Search .................................... 359/290, 291, 359/292

[56] References Cited

U.S. PATENT DOCUMENTS

| | | | |
|---|---|---|---|
| 5,469,302 | 11/1995 | Lim | 359/846 |
| 5,768,006 | 6/1998 | Min et al. | 359/290 |
| 5,786,928 | 7/1998 | Nam et al. | 359/295 |
| 5,808,782 | 9/1998 | Min | 359/292 |
| 5,815,304 | 9/1998 | Choi | 359/291 |
| 5,815,305 | 9/1998 | Min et al. | 359/292 |

FOREIGN PATENT DOCUMENTS 0810458  12/1997  European Pat. Off. .
WO 98/00978  1/1998  WIPO .

*Primary Examiner*—Georgia Epps
*Assistant Examiner*—Suzanne Letendre
*Attorney, Agent, or Firm*—Pillsbury Madison & Sutro LLP

[57] ABSTRACT

Thin film AMA is disclosed. The thin film AMA has an active matrix, a supporting member, actuating parts and a reflecting member. The supporting member has a supporting line, a rectangular ring-shaped supporting layer, anchors. Insulating members are formed from top electrodes to the supporting layer. The anchors supporting the actuating parts are formed perpendicular to the actuating parts. The initial tiltings of the actuating parts are prevented because the stress concentration line doesn't generated. Therefore, the desired reflection angle of the reflecting member may be regular, so the light efficiency is enhanced and the quality of the picture projected onto the screen is increased. Also, the electrical shorts generated between the top electrodes and the bottom electrodes may be prevented by the insulating members, so point defects of pixels are effectively decreased.

20 Claims, 17 Drawing Sheets

155   160

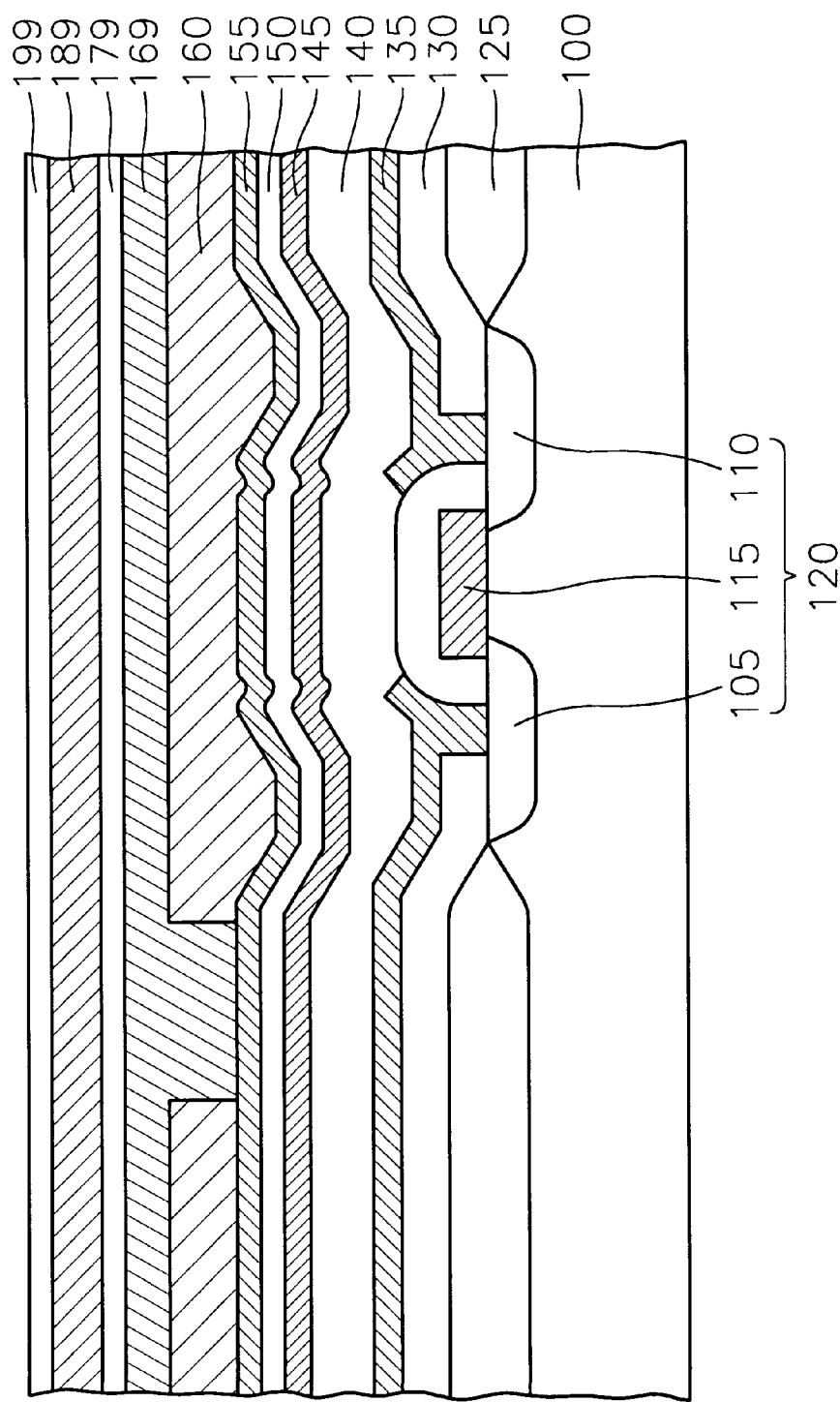

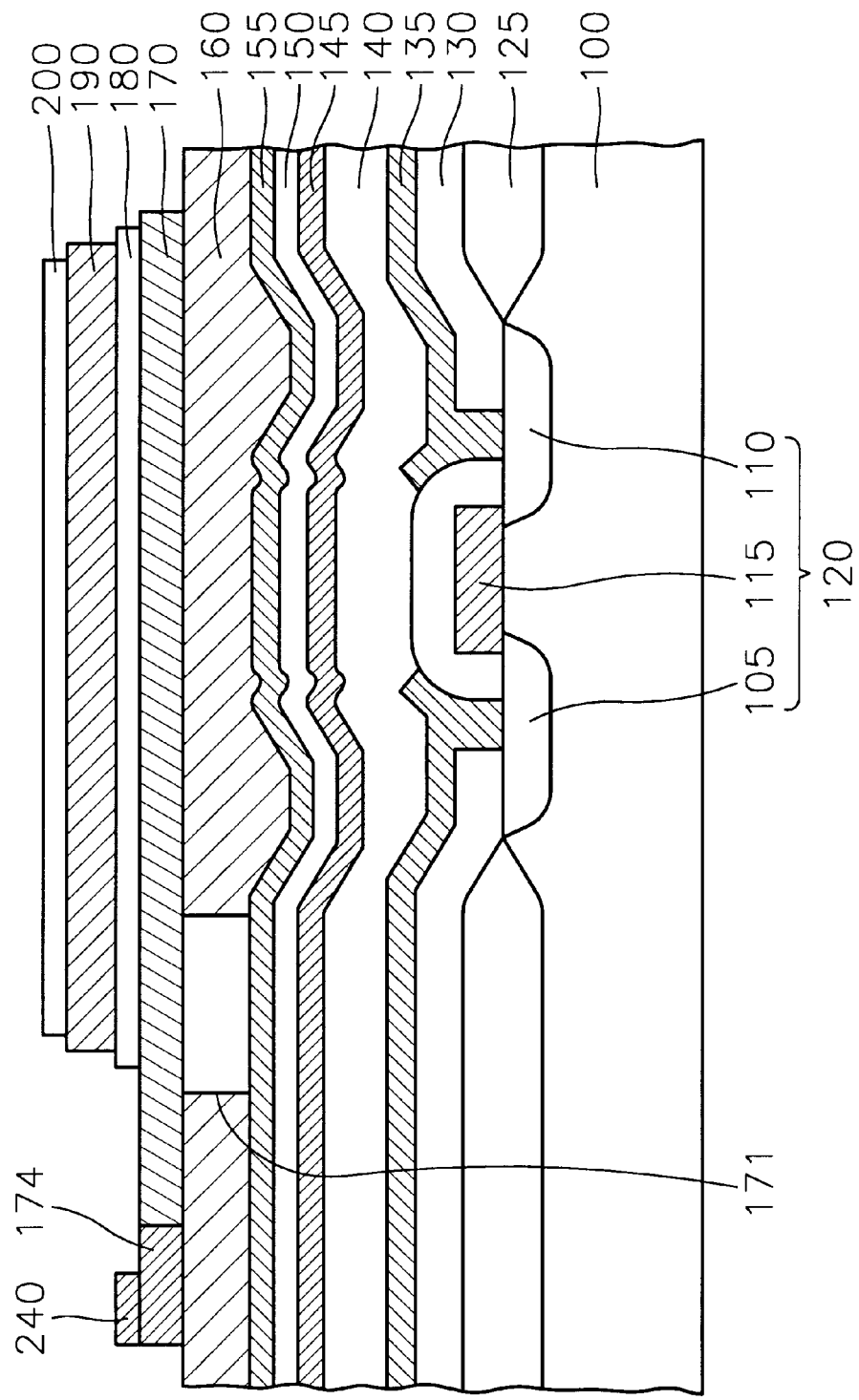

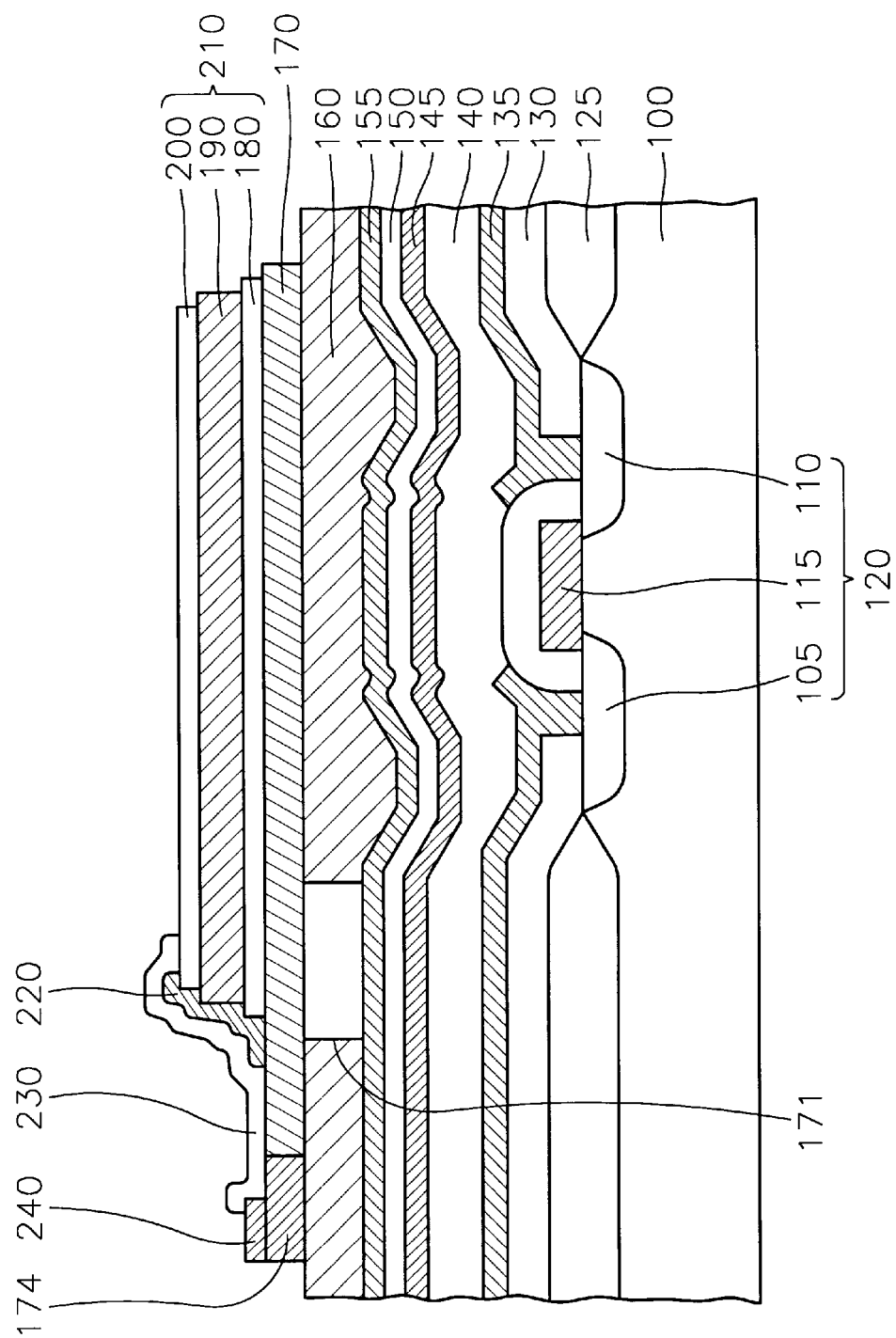

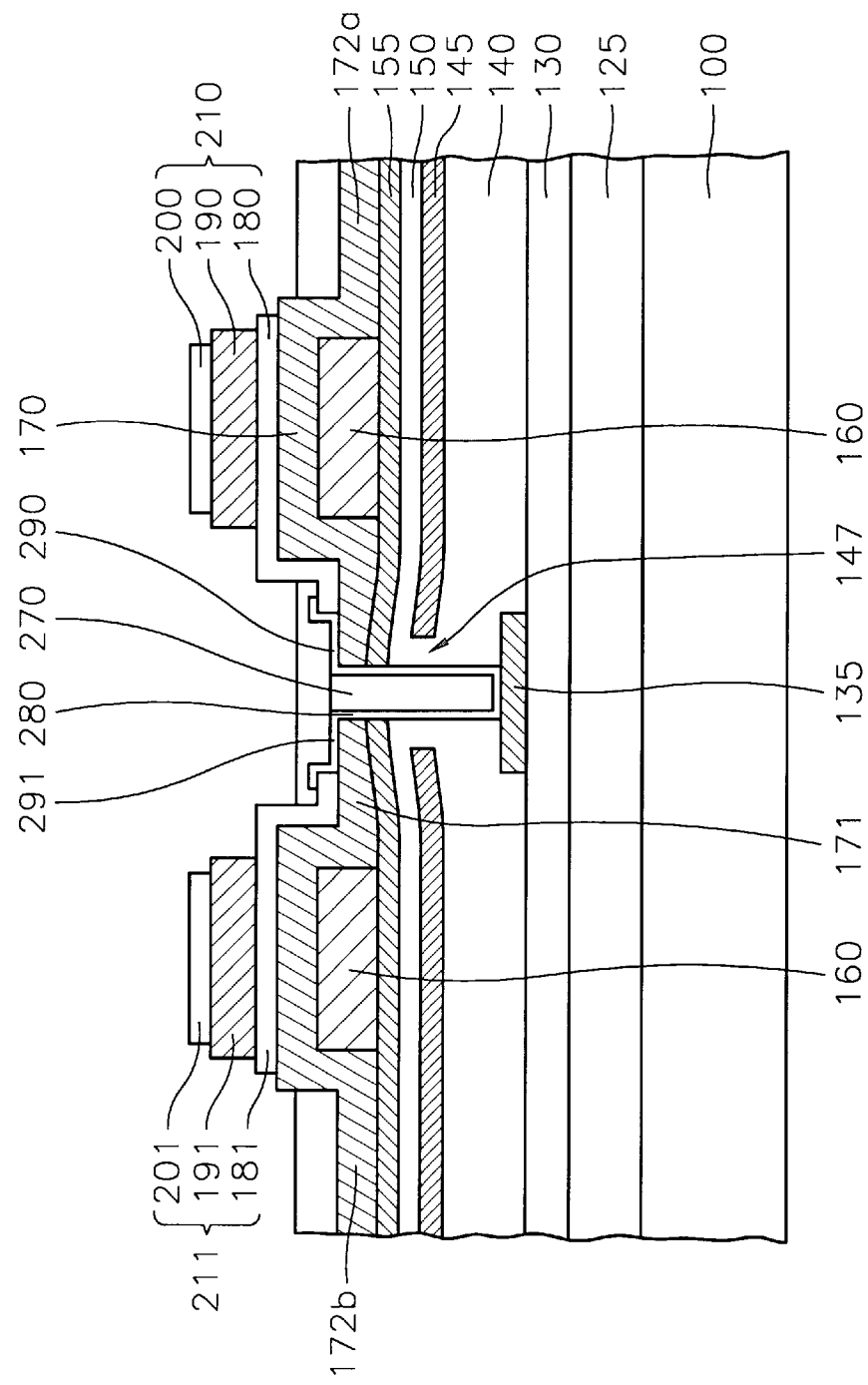

THIN FILM ACTUATED MIRROR ARRAY IN AN OPTICAL PROJECTION SYSTEM

BACKGROUND OF THE INVENTION

1. Field of the Invention

The present invention relates to a thin film actuated mirror array in an optical projection system, and more particularly to a thin film actuated mirror array in an optical projection system effectively preventing point defects of pixels and enhancing the quality of a picture projected onto a screen.

In general, light modulators are divided into two groups according to their optics. One type is a direct light modulator such as a cathode ray tube (CRT) and the other type is a transmissive light modulator such as a liquid crystal display (LCD). The CRT produces superior quality pictures on a screen, but the weight, the volume and the manufacturing cost of the CRT increase according to the magnification of the screen. The LCD has a simple optical structure, so the weight and the volume of the LCD are less than those of the CRT. However, the LCD has a poor light efficiency of under 1 to 2% due to light polarization. Also, there are some problems in the liquid crystal materials of the LCD such as sluggish response and overheating.

Thus, a digital mirror device (DMD) and actuated mirror arrays (AMA) have been developed in order to solve these problems. At the present time, the DMD has a light efficiency of about 5% and the AMA has a light efficiency of above 10%. The AMA enhances the contrast of a picture on a screen, so the picture on the screen is more apparent and brighter. The AMA is not affected by and does not affect the polarization of light and therefore, the AMA is more efficient than the LCD or the DMD.

FIG. 1 shows a schematic diagram of an engine system of a conventional AMA which is disclosed in U.S. Pat. No. 5,126,836 (issued to Gregory Um). Referring to FIG. 1, a ray of incident light from light source 1 passes a first slit 3 and a first lens 5 and is divided into red, green, and blue lights according to the Red Green Blue (R G B) system of color representation. After the divided red, green, and blue lights are respectively reflected by a first mirror 7, a second mirror 9, and a third mirror 11, the reflected lights are respectively incident on AMA devices 13, 15 and 17 corresponding to the mirrors 7, 9 and 11. The AMA devices 13, 15 and 17 tilt the mirrors installed therein, so the incident light is reflected by the mirrors. In this case, the mirrors installed in the AMA devices 13, 15 and 17 are tilted according to the deformation of active layers formed under the mirrors. The light reflected by the AMA devices 13, 15 and 17 pass a second lens 19 and a second slit 21 and form a picture on a screen (not shown) by using projection lens 23.

In most cases, ZnO is used as the active layer. However, lead zirconate titanate (PZT:Pb(Zr,Ti)O$_3$) has a better piezoelectric property than ZnO. PZT is a complete solid solution of lead zirconate (PbZrO$_3$) and lead titanate (PbTiO$_3$). A cubic structure PZT exists in a paraelectric phase at a high temperature. An orthorhombic structure PZT exists in an antiferroelectric phase, a rhombohedral structure PZT exists in a ferroelectric phase, and a tetragonal structure PZT exists in a ferromagnetic phase according to the composition ratio of Zr and Ti at a room temperature. A morphotropic phase boundary (MPB) of the tetragonal phase and the rhombohedral phase exists as a composition which includes Zr:Ti at a ratio of 1:1. PZT has a maximum dielectric property and a maximum piezoelectric property at the MPB. The MPB exists in a wide region in which the tetragonal phase and the rhombohedral phase coexist, but does not exist at a certain composition. Researchers do not agree about the composition of the phase coexistent region of PZT. Various theories such as thermodynamic stability, compositional fluctuation, and internal stress have been suggested as the reason for the phase coexistent region. Nowadays, a PZT thin film is manufactured by various processes such as spin coating method, organometallic chemical vapor deposition (OMCVD) method, and sputtering method.

The AMA is generally divided into a bulk type AMA and a thin film type AMA. The bulk type AMA is disclosed in U.S. Pat. No. 5,469,302 (issued to Dae-Young Lim). In the bulk type AMA, after a ceramic wafer which is composed of a multilayer ceramic inserted into metal electrodes therein is mounted on an active matrix having transistors, a mirror is mounted on the ceramic wafer by means of sawing the ceramic wafer. However, the bulk type AMA has disadvantages in that it demands a very accurate process and design, and the response of an active layer is slow. Therefore, the thin film AMA which is manufactured by using semiconductor technology has been developed.

The thin film AMA is disclosed at U.S. Pat. No. 5,815,304 (issued to CHI) entitled "THIN FILM ACTUATED MIRROR ARRAY IN AN OPTICAL PROJECTION SYSTEM AND METHOD FOR MANUFACTURING THE SAME".

FIG. 2 is a plan view for showing the thin film AMA, FIG. 3 is a perspective view for showing the thin film AMA in FIG. 2 and FIG. 4 is a cross-sectional view taken along line $A_1$–$A_2$ of FIG. 3.

Referring to FIGS. 2 to 4, the thin film AMA has a substrate 31, an actuator 57 formed on the substrate 31, and a reflecting member 55 formed at a central portion of the actuator 57.

The substrate 31 including electrical wiring (not shown) has a connecting terminal 33 formed on the electrical wiring, a passivation layer 35 overlayed on the substrate 31 and on the connecting terminal 33, and an etching stop layer 37 overlayed on the passivation layer 35. The actuator 57 has a supporting layer 43, a bottom electrode 45, an active layer 47, a top electrode 49 and a via contact 53.

Referring to FIG. 3, the supporting layer 43 has a first portion attached beneath the bottom electrode 45 and a second portion exposed out of the bottom electrode 45. Bottoms of both lateral borders of the supporting layer 43 are partially attached to the etching stop layer 37. The attached portions of the supporting layer 43 are called anchors 43a, 43b which support the actuator 57. The lateral borders of the supporting layer 43 are parallelly prolonged from the attached portions. The central portion of the supporting layer 43 is integrally formed with the lateral borders between the lateral borders. The central portion of the supporting layer 43 has a rectangular shape.

The bottom electrode 45 is formed on the central portion and on the lateral borders of the supporting layer 43. The active layer 47 is formed on the bottom electrode 45 and the top electrode 49 is formed on the active layer 47. The bottom electrode 45 has a U-shape. The active layer 47 is smaller than the bottom electrode 45 and has the same shape as that of the bottom electrode 45. The top electrode 49 is smaller than the active layer 47 and has the same shape as that of the active layer 47. When a first signal is applied to the bottom electrode 45 and a second signal is applied to the top electrode 49, an electric field is generated between the top electrode 49 and the bottom electrode 45, so the active layer 47 is deformed by the electric field.

The via contact 53 is formed in a via hole 51 which is formed from a portion of the active layer 47 to the connecting terminal 33 through the bottom electrode 45, the supporting layer 43, the etching stop layer 37 and the passivation layer 35. The via contact 53 connects the bottom electrode 45 to the connecting terminal 33.

The reflecting member 55 for reflecting an incident light is formed at the central portion of the supporting layer 43. The reflecting member 55 has a predetermined thickness from the surface of the supporting layer 43 to a side of the active layer 47. Preferably, the reflecting member 55 is a mirror which has a rectangular shape.

A method for manufacturing the thin film AMA will be described as follows.

FIGS. 5A to 5D illustrate manufacturing steps of the thin film AMA.

Referring to FIG. 5A, the passivation layer 35 is formed on the substrate 31 having the electrical wiring (not shown) and the connecting terminal 33. The electrical wiring and the connecting terminal 33 receive the first signal (picture signal) from outside and transmit the first signal to the bottom electrode 45. Preferably, the electrical wiring has a metal oxide semiconductor (MOS) transistor for switching operation. The connecting terminal 33 is formed by using a metal, for example tungsten (W). The connecting terminal 33 is connected to the electrical wiring. The passivation layer 35 is formed by using phosphor-silicate glass (PSG) and by chemical vapor deposition (CVD) method so that the passivation layer 35 has a thickness of between 0.1 μm and 1.0 μm. The passivation layer 35 protects the substrate 31 having the electrical wiring and the connecting terminal 33 during subsequent manufacturing steps.

The etching stop layer 37 is formed on the passivation layer 35 by using a nitride and by low pressure chemical vapor deposition (LPCVD) method so that the etching stop layer 37 has a thickness of between 1000 Å and 2000 Å. The etching stop layer 37 protects the passivation layer 35 and the substrate 31 during subsequent etching steps.

A sacrificial layer 39 is formed on the etching stop layer 37 by using a PSG and by atmospheric pressure CVD (APCVD) method so that the sacrificial layer 39 has a thickness of between 0.5 μm and 4.0 μm. In this case, the degree of flatness of the sacrificial layer 39 is poor because the sacrificial layer 39 covers the top of the substrate 31 including the electrical wiring and the connecting terminal 33. Therefore, the surface of the sacrificial layer 39 is planarized by using a spin on glass (SOG) or by chemical mechanical polishing (CMP) method. Subsequently, a first portion of the sacrificial layer 39 having the connecting terminal 33 thereunder and a second portion of the sacrificial layer 39 which is adjacent to the first portion of the sacrificial layer 39 are etched in order to expose a first portion of the etching stop layer 37 having the connecting terminal 33 thereunder and a second portion of the etching stop layer 37 which is adjacent to the first portion of the etching layer 37 with respect to form the supporting layer 43.

Referring to FIG. 5B, a first layer is formed on the first and second portions of the etching stop layer 37 and on the sacrificial layer 39. The first layer is formed by using a rigid material such as a nitride or a metal. The first layer is formed by LPCVD method so that the first layer has a thickness of between 0.1 μm and 1.0 μm. The first layer will be patterned so as to form the supporting layer 43.

A bottom electrode layer is formed on the first layer by using an electrically conductive metal such as platinum (Pt), tantalum (Ta) or platinum-tantalum (Pt—Ta). The bottom electrode layer is formed by sputtering method or CVD method so that the bottom electrode layer has a thickness of between 0.1 μm and 1.0 μm. Subsequently, the bottom electrode layer is iso-cutted in order to separate each bottom electrode layer, so each pixel of the thin film AMA independently receives the first signal from outside through the electrical wiring and the connecting terminal 33. The bottom electrode layer will be patterned to form the bottom electrode 45.

A second layer is formed on the bottom electrode layer by using a piezoelectric material such as PZT (Pb(Zr, Ti)O$_3$) or PLZT ((Pb, La)(Zr, Ti)O$_3$) so that the second layer has a thickness of between 0.1 μm and 1.0 μm. Preferably, the second layer has a thickness of about 0.4 μm. After the second layer is formed by sol-gel method, sputtering method or CVD method, the second layer is annealed by rapid thermal annealing (RTA) method. The second layer will be patterned to form the active layer 47.

A top electrode layer is formed on the second layer by using an electrically conductive metal, for example, aluminum (Al), platinum or silver (Ag). The top electrode layer is formed by sputtering method or CVD method so that the top electrode layer has a thickness of between 0.1 μm and 1.0 μm. The top electrode layer also will be patterned to form the top electrode 49.

Referring to FIG. 5C, after a first photo resist (not shown) is coated on the top electrode layer by spin coating method, the top electrode layer is patterned to form the top electrode 49 by using the first photo resist as an etching mask. As a result, the top electrode 49 has a U-shape. The second signal (bias signal) is applied to the top electrode 49 for generating the electric field between the top electrode 49 and the bottom electrode 45.

A second photo resist (not shown) is coated on the top electrode 49 and on the second layer by spin coating method after the first photo resist is removed by etching. The second layer is patterned to form the active layer 47 by using the second photo resist as an etching mask. The active layer 47 has a U-shape which is wider than that of the top electrode 49. After the second photo resist is removed by etching, a third photo resist (not shown) is coated on the top electrode 49, on the active layer 47 and on the bottom electrode layer by spin coating method. The bottom electrode layer is patterned to form the bottom electrode 45 by using the third photo resist as an etching mask. The bottom electrode 45 has a U-shape which is wider than that of the active layer 47. Then, the third photo resist is removed by etching.

Subsequently, portions of the active layer 47, the bottom electrode 45, the first layer, the etching stop layer 37 and the passivation layer 35 are etched so as to form the via hole 51 from the portion of the active layer 47 to the connecting terminal 33. The via contact 53 is formed in the via hole 51 by using an electrically conductive metal such as tungsten (W), platinum, aluminum or titanium. The via contact 53 is formed by sputtering method or CVD method so that the via contact 53 is formed from the connecting terminal 33 to the bottom electrode 45. The via contact 53 connects the bottom electrode 45 to the connecting terminal 33.

Referring to FIG. 5D, the first layer is patterned to form the supporting layer 43 by using a fourth photo resist (not shown) as an etching mask after the fourth photo resist is coated on the bottom electrode 45 by spin coating method. The supporting layer 43 has the lateral borders and the central portion. The bottoms of the lateral borders of the supporting layer 43 are partially attached to the etching stop layer 37 and are called anchors 43a, 43b. The lateral borders of the supporting layer 43 are formed parallel to and above the etching stop layer 37 from the attached portions. The central portion of the supporting layer 43 is integrally formed with the lateral borders between the lateral borders. The central portion of the supporting layer 43 has a rectangular shape. Then, the fourth photo resist is removed by etching. A portion of sacrificial layer 39 is exposed when the first layer is patterned.

After a fifth photo resist (not shown) is coated on the exposed portion of the sacrificial layer 39 and on the supporting layer 43 by spin coating method, the fifth photo resist is patterned to expose the central portion of the supporting layer 43. The reflecting member 55 is formed on the central portion of the supporting layer 43 by using a reflective material such as silver, platinum, or aluminum. The reflecting member 55 is formed by sputtering method or CVD method so that the reflecting member 55 has a thickness of between 0.3 $\mu$m and 2.0 $\mu$m. The reflecting member 55 for reflecting the incident light from a light source (not shown) has the same shape as that of the central portion of the supporting layer 43. Subsequently, the fifth photo resist and the sacrificial layer 39 are removed by using hydrogen fluoride (HF) vapor, so the actuator 57 is complete. When the sacrificial layer 39 is removed, an air gap 41 is formed where the sacrificial layer 39 is located.

The first signal is applied to the bottom electrode 45 from outside through the electrical wiring, the connecting terminal 33 and the via contact 53. At the same time, when the second signal is applied to the top electrode 49 from a common line (not shown), the electric field is generated between the top electrode 49 and the bottom electrode 45. The active layer 47 formed between the top electrode 49 and the bottom electrode 45 is deformed by the electric field. The active layer 47 is deformed in the direction perpendicular to the electric field. The actuator 57 having the active layer 47 is actuated in the opponent direction to the position where the supporting layer 43 is positioned. That is, the actuator 57 is actuated upward and the supporting layer 43 attached to bottom electrode 45 is also actuated upward according to the tilting of the actuator 57.

The reflecting member 55 reflecting the incident light from the light source is tilted with the actuator 57 because the reflecting member 55 is formed at the central portion of the supporting layer 43. Hence, the reflecting member 55 reflects the light onto a screen so the picture is formed on the screen.

However, in the above-described thin film AMA, cracks are generated from the portion of the second layer (the active layer) formed at iso-cutted portion of the bottom electrode layer into the other portion of the second layer because the second layer is formed on the bottom electrode layer after the bottom electrode layer is iso-cutted in order to separate the pixels of the thin film AMA. Therefore, an electrical short may be occurred between the top electrode and the bottom electrode since the top electrode and the bottom electrode are partially connected each other through the cracks generated in the active layer. When the electrical short is generated, the actuator cannot be actuated so the point defect of pixel may be occurred in the thin film AMA.

Also, the actuator may be initially tilted without applying of the first and the second signals because the deformation driving force such as uneven residual stresses and stress gradient are applied to the stress concentration line which is generated when the sacrificial layer is patterned so as to form the anchors for supporting the actuator. Therefore, the light efficiency of the incident light may be decrease because the reflecting member does not have a desired tilting angle when the actuator is initially tilted, so the quality of the picture projected onto the screen is decreased.

SUMMARY OF THE INVENTION

Accordingly, considering the conventional problems as described above, it is an object of the present invention to provide a thin film actuated mirror array in an optical projection system effectively preventing point defects of pixels without iso-cutting of bottom electrodes and enhancing the quality of a picture projected onto a screen by increasing the light efficiency of the incident light.

To accomplish the above object, there is provided in the present invention a thin film actuated mirror array in an optical projection system having an active matrix, a supporting member, a first actuating part, a second actuating part and a reflecting member.

The active matrix has a substrate including a metal oxide semiconductor transistor installed therein for switching operation and a first metal layer having a drain pad prolonged from a drain of the metal oxide semiconductor for transmitting a first signal.

The supporting member has a supporting line, a supporting layer, a first anchor and two second anchors. The supporting line is formed above the active matrix and the supporting layer is integrally formed with the supporting line. The supporting layer has a rectangular ring shape. The first anchor and the second anchors are respectively formed between the active matrix and portions of the supporting layer adjacent to the supporting line.

The first actuating part has a first bottom electrode, a first active layer and a first top electrode. The first bottom electrode receives the first signal. The first bottom electrode is formed at a first portion of the supporting layer which is formed perpendicular to the supporting line and the first top electrode corresponds to the first bottom electrode. The first top electrode receives a second signal and generates a first electric field. The first active layer is formed between the first bottom electrode and the first top electrode and is deformed by the first electric field.

The second actuating part also has a second bottom electrode, a second active layer and a second top electrode. The second bottom electrode receives the first signal. The second bottom electrode is formed at a second portion of the supporting layer which is formed perpendicular to the supporting line. The second top electrode corresponds to the second bottom electrode and receives the second signal so it generates a second electric field. The second active layer is formed between the second bottom electrode and the second top electrode and deformed by the second electric field.

The reflecting member is formed above the first actuating part and the second actuating part so as to reflect an incident light.

Preferably, the active matrix further has a first passivation layer formed on the first metal layer and on the substrate, a second metal layer formed on the first passivation layer, a second passivation layer formed on the second metal layer and an etching stop layer formed on the second passivation layer.

The first bottom electrode has a rectangular shape having a protruding portion, the first active layer has a rectangular shape smaller than the first bottom electrode, and the first top electrode has a rectangular shape smaller than the first active layer. Also, the second bottom electrode has a rectangular shape having a protruding portion corresponding to the protruding portion of the first bottom electrode, the second active layer has a rectangular shape smaller than the second bottom electrode, and the second top electrode has a rectangular shape smaller than the second active layer.

Preferably, the first bottom electrode has an inversed L shape and the second bottom electrode has an L shape corresponding to the first bottom electrode.

The first anchor is formed beneath and between the first actuating part and the second actuating part and is attached to a first portion of the active matrix where the drain pad is formed thereunder, and the second anchors are respectively formed beneath outsides of the first actuating part and the second actuating part. The second anchors are respectively attached to a second portion and to a third portion of the active matrix which are adjacent to the first portion of the active matrix.

Preferably, the thin film actuated mirror array further has a via contact for transmitting the first signal from the drain pad to the first bottom electrode and to the second bottom electrode, a first bottom electrode connecting member formed from the via contact to the protruding portion of the first bottom electrode and a second bottom electrode connecting member formed from the via contact to the protruding portion of the second bottom electrode. The via contact is formed in a via hole which is formed from the first anchor to the drain pad. The via contact, the first bottom electrode connecting member and the second bottom electrode connecting member are formed by using an electrically conductive metal such as silver, platinum, tantalum or platinum-tantalum.

More preferably, the thin film actuated mirror array further has a common line for transmitting the second signal, a first insulating member formed from a portion of the first top electrode to a portion of the supporting layer via a portion of the first bottom electrode, a first top electrode connecting member formed from the common line to the first top electrode via the first insulating member, a second insulating member formed from a portion of the second top electrode to a portion of the supporting layer via a portion of the second bottom electrode, and a second top electrode connecting member formed from the common line to the second top electrode via the second insulating member. The common line is formed on the supporting line.

The first and the second insulating members are formed by using amorphous silicon or low temperature oxide such as silicon dioxide ($SiO_2$) or phosphorus pentoxide ($P_2O_5$).

The first and the second top electrode connecting members are formed by using an electrically conductive metal such as silver, platinum, tantalum or platinum-tantalum.

A post for supporting the reflecting member is formed between a central portion of the reflecting member and a portion of the supporting layer which is apart parallel to the supporting line.

In the thin film AMA according to the present invention, the first signal is applied from outside to the first and the second bottom electrodes via the MOS transistor installed in the substrate, the drain pad of the first metal layer, the via contact, and the first and the second bottom electrode connecting members. At the same time, the second signal is applied from outside to the first and the second top electrodes via the common line and the first and the second top electrode connecting members. Thus, the first electric field is generated between the first top electrode and the first bottom electrode, and the second electric field is generated between the second top electrode and the second bottom electrode. The first active layer formed between the first top electrode and the first bottom electrode is deformed by the first electric field and the second active layer formed between the second top electrode and the second bottom electrode is deformed by the second electric field. The first and the second active layers are respectively deformed in the directions perpendicular to the first and the second electric fields. The first actuating part having the first active layer and the second actuating part having the second active layer are actuated in the opponent direction to the position where the supporting layer is located. That is, the first and the second actuating parts are actuated upward and the supporting layer attached to the first and the second bottom electrodes is also actuated upward according to the tiltings of the first and the second actuating parts.

The reflecting member is supported by the post which is formed on the portion of the supporting layer. The reflecting member reflecting the incident light from the light source is tilted with the first and the second actuating parts. Hence, the reflecting member reflects the light onto a screen, so a picture is formed on the screen.

According to the present invention, the first and the second anchors supporting the actuating parts are formed in perpendicular direction to the actuating parts. The actuating parts have level surfaces without initial tiltings because the stress concentration line is not generated between the anchors and the actuating parts. Thus, the desired reflection angle of the reflecting member formed on the actuating parts may be regular, so the light efficiency is enhanced and the quality of the picture projected onto the screen is increased.

Also, the electrical shorts generated between the top electrodes and the bottom electrodes are prevented by the insulating members. Therefore, point defects of pixels in the thin film AMA are effectively decreased.

BRIEF DESCRIPTION OF THE DRAWINGS

The above object and advantage of the present invention will become more apparent by describing in detail preferred embodiment thereof with reference to the attached drawings, in which:

FIGS. 10A to 10G illustrate manufacturing steps of the thin film actuated mirror array in an optical projection system according to the present invention.

DETAILED DESCRIPTION OF THE INVENTION

Hereinafter, the preferred embodiment of the present invention will be explained in more detail with reference to the accompanying drawings.

Figure 1:
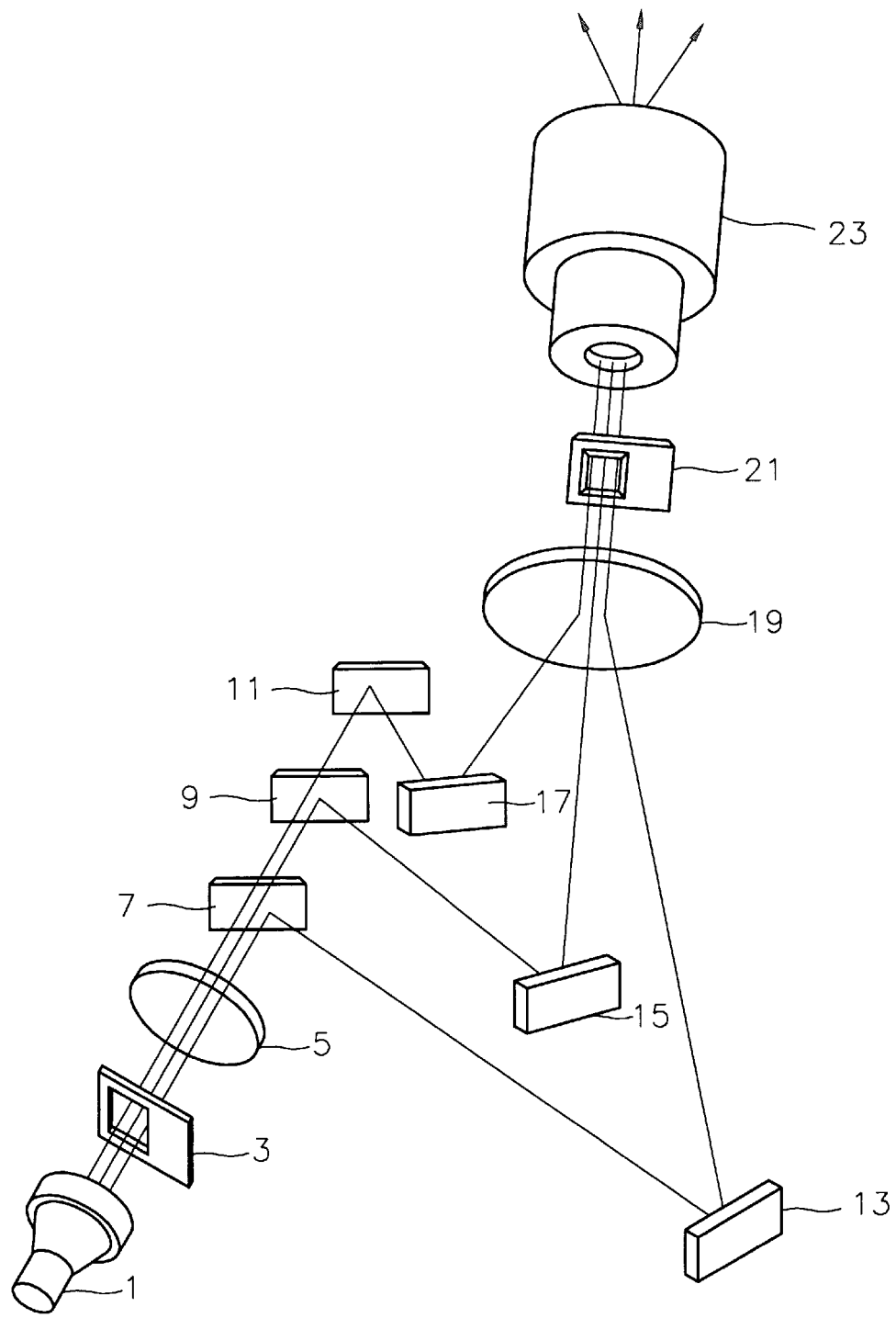
FIG. 1 is a schematic view for showing an engine system of a conventional actuated mirror array.
Figure 2:
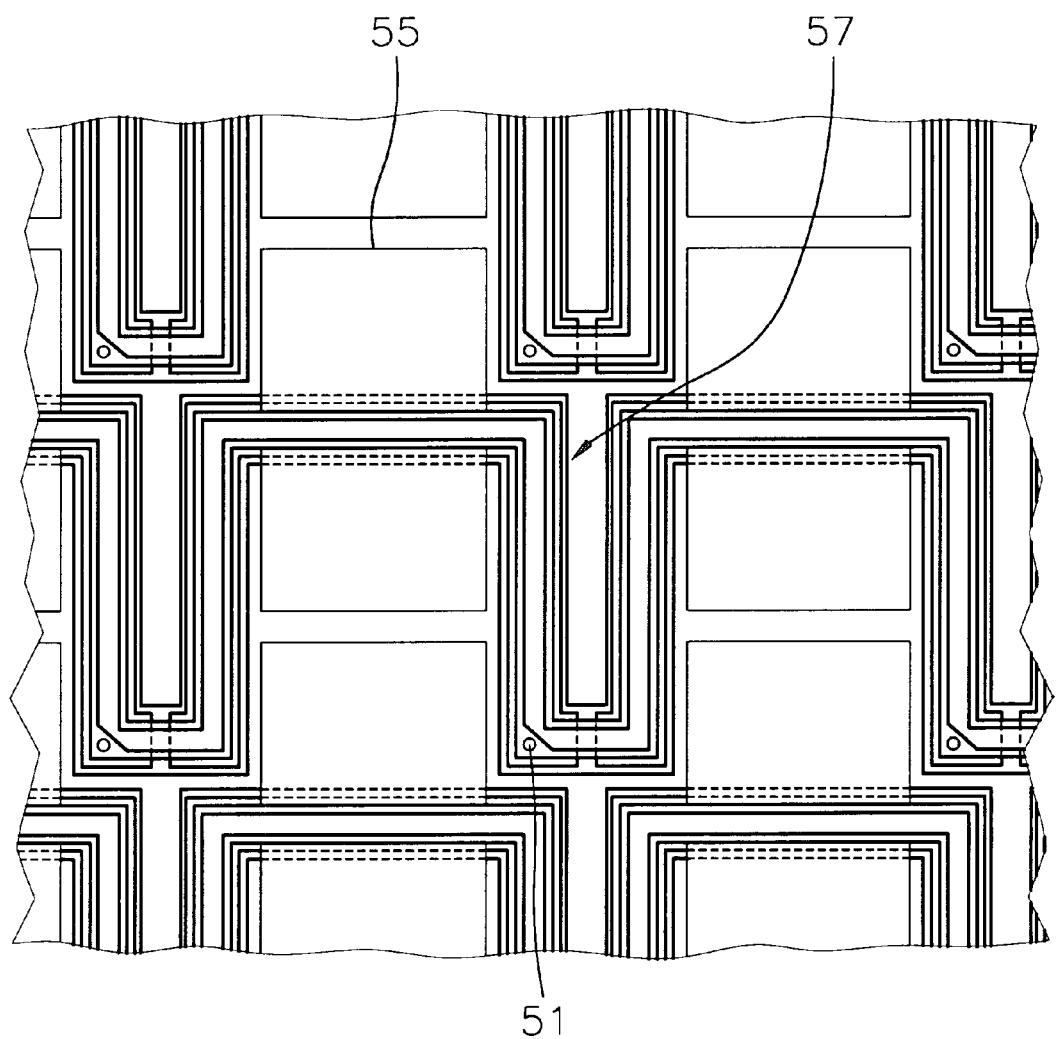
FIG. 2 is a plan view for showing a thin film actuated mirror array in an optical projection system disclosed in a prior application of the assignee of this application.
Figure 3:
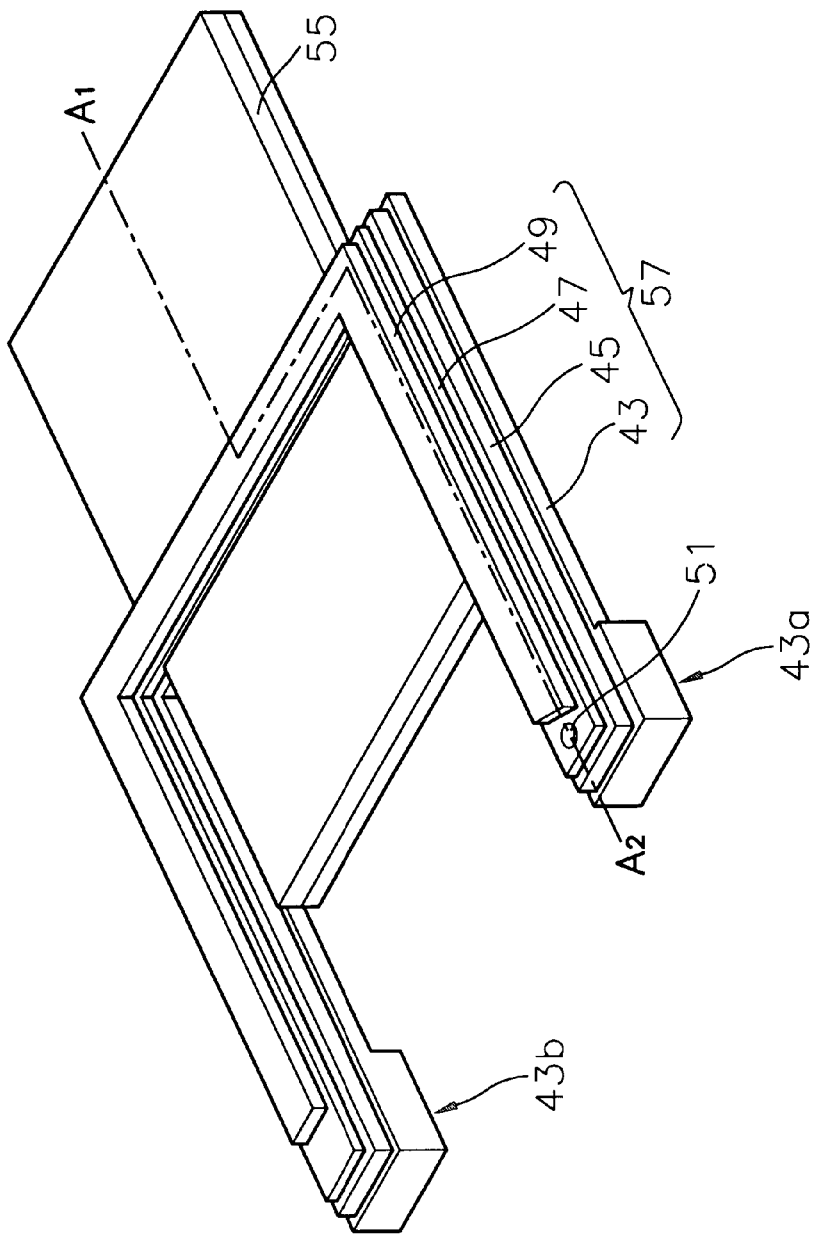
FIG. 3 is a perspective view for showing the thin film actuated mirror array in an optical projection system in FIG. 2.
Figure 4:
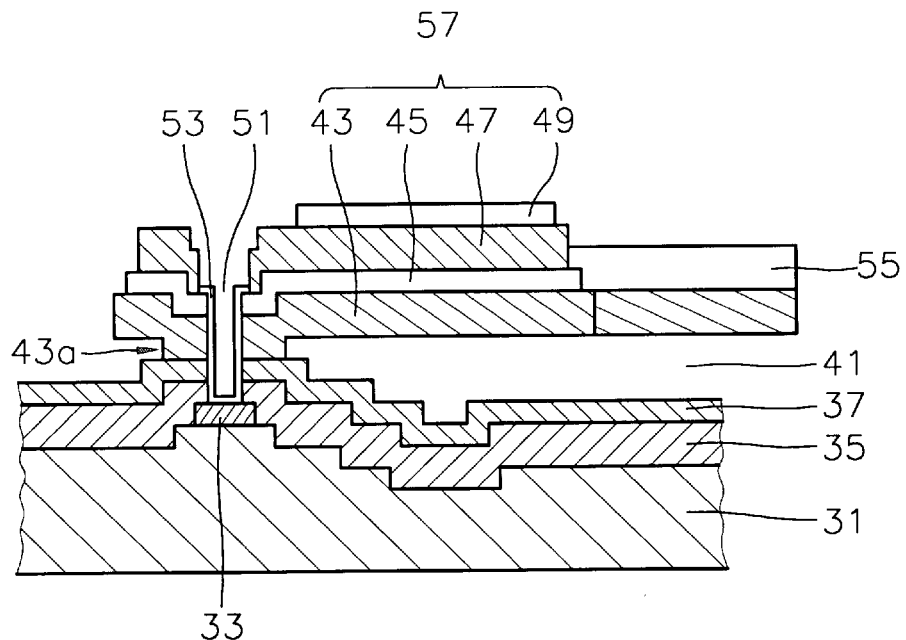
FIG. 4 is a cross-sectional view taken along line $A_1-A_2$ of FIG. 3.
Figure 5A:
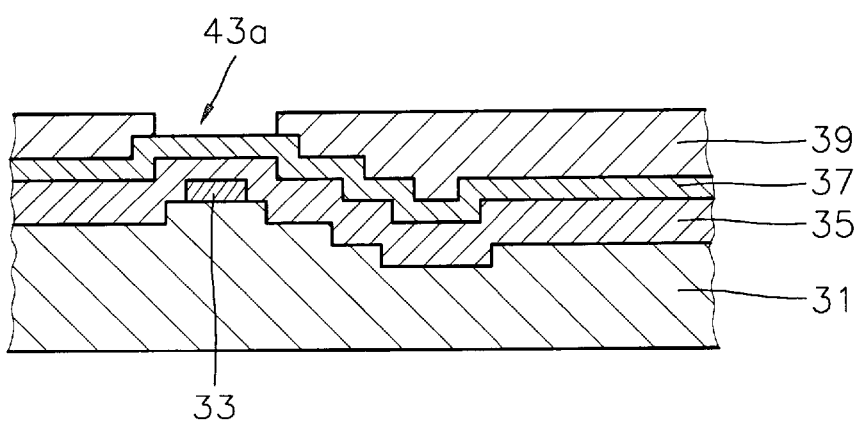
FIGS. 5A to 5D illustrate manufacturing steps of the thin film actuated mirror array in an optical projection system in FIG. 4.
Figure 5B:
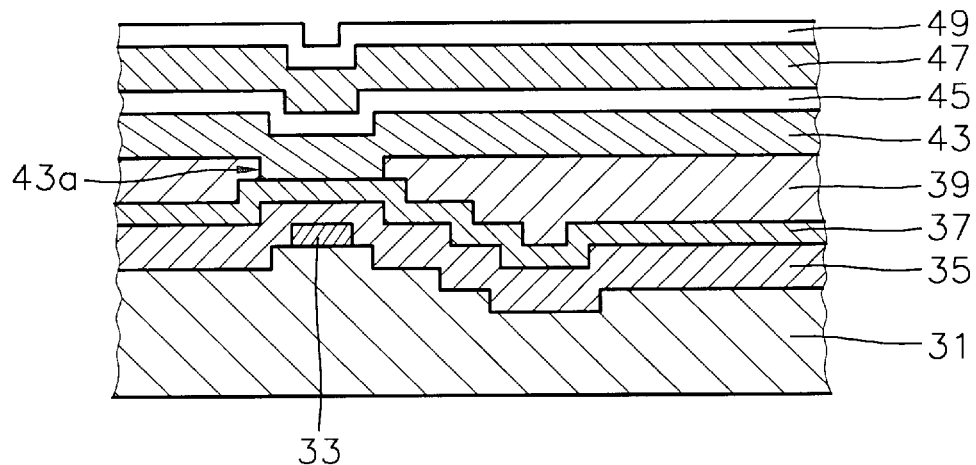
Figure 5C:
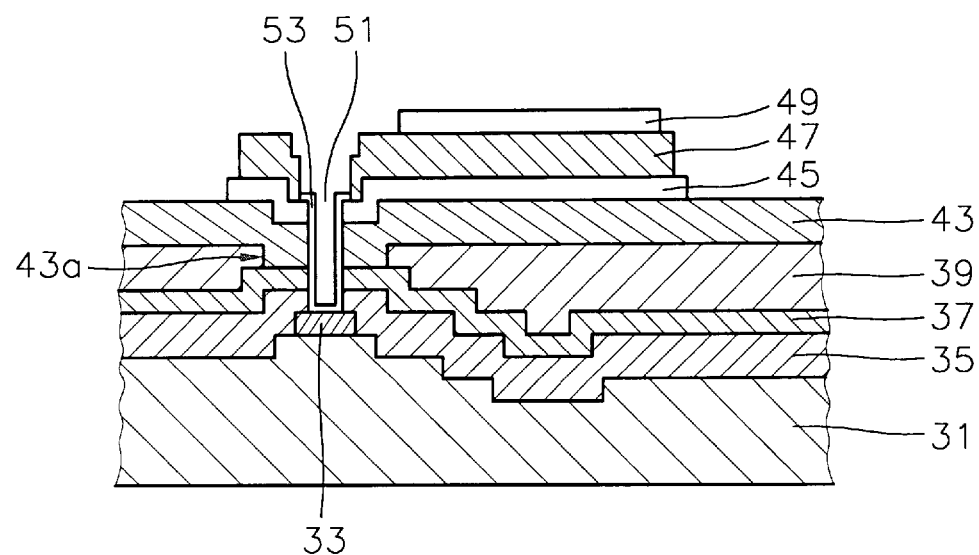
Figure 5D:
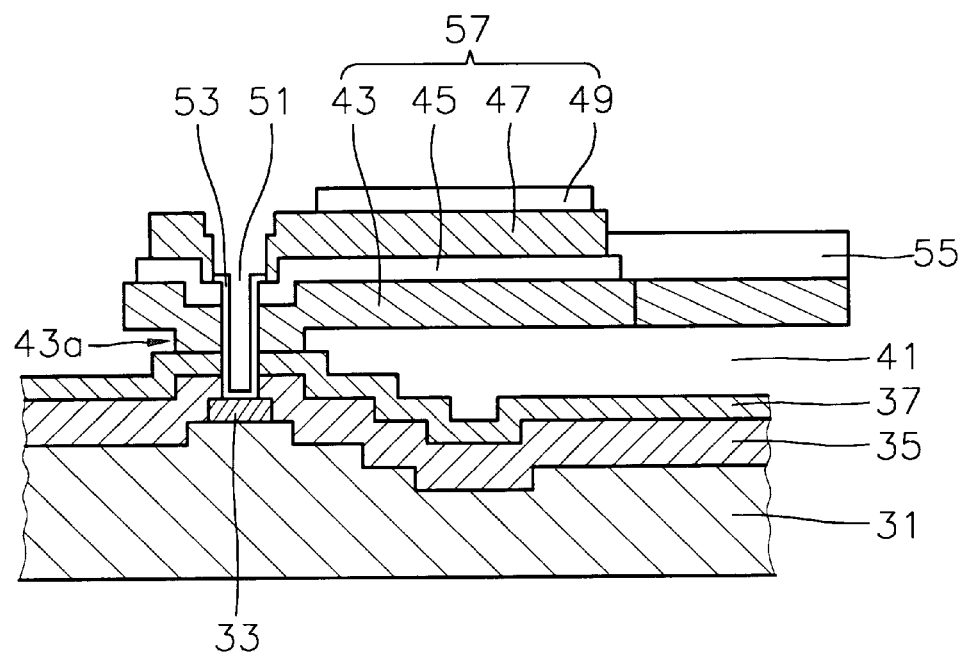
Figure 6:
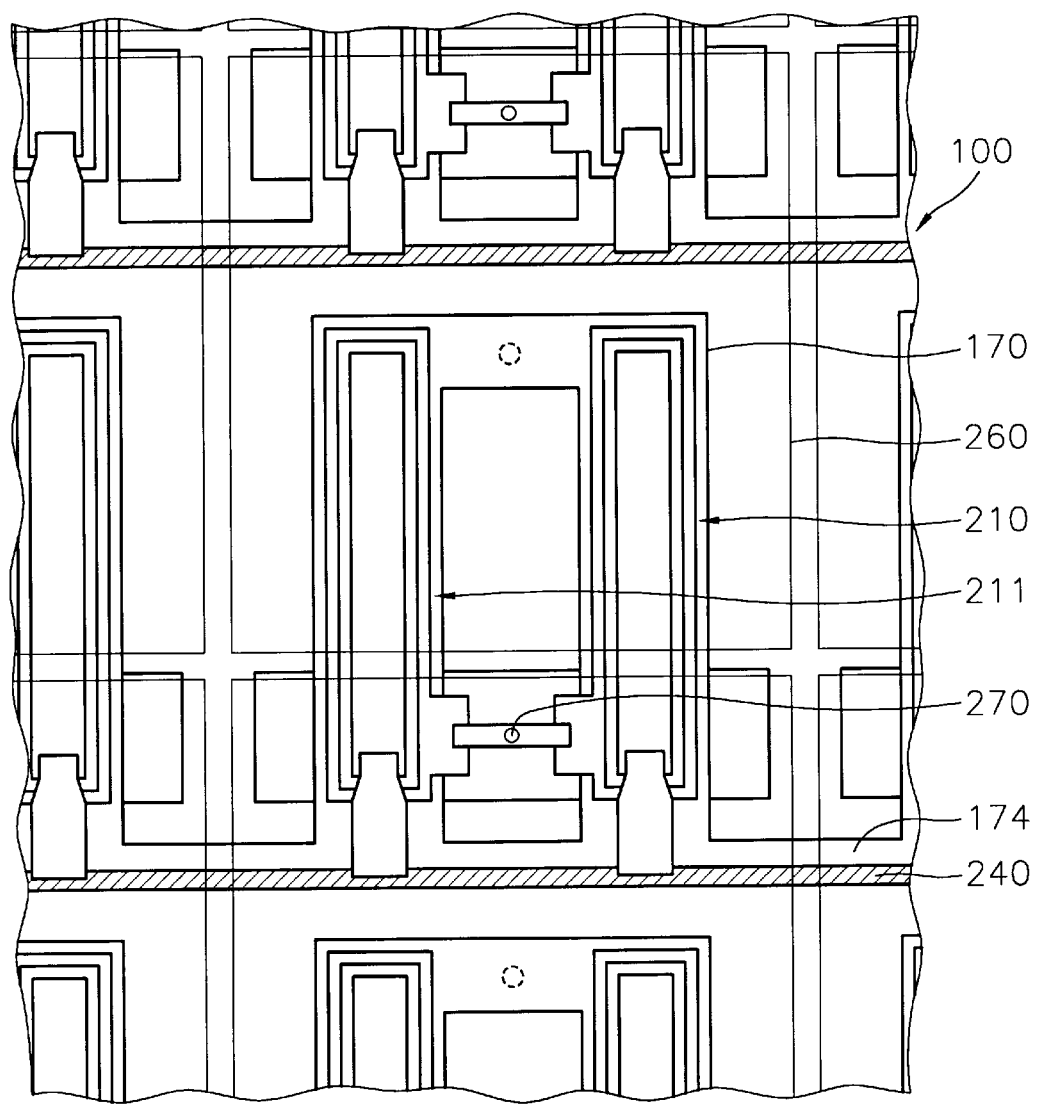
FIG. 6 is a plan view for showing a thin film actuated mirror array in an optical projection system according to the present invention.
Figure 7:
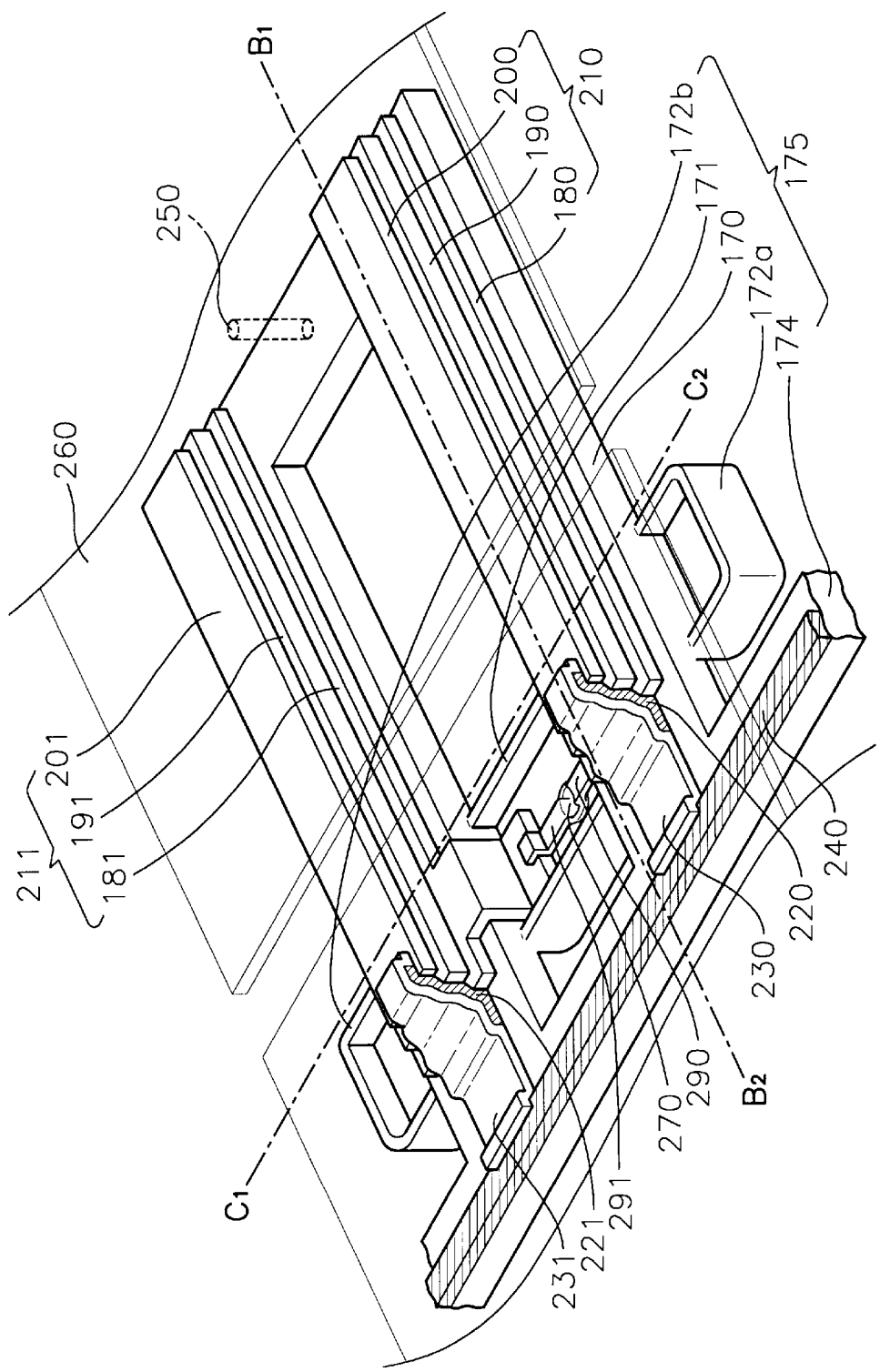
FIG. 7 is a perspective view for showing the thin film actuated mirror array in an optical projection system in FIG. 6.
Figure 8:
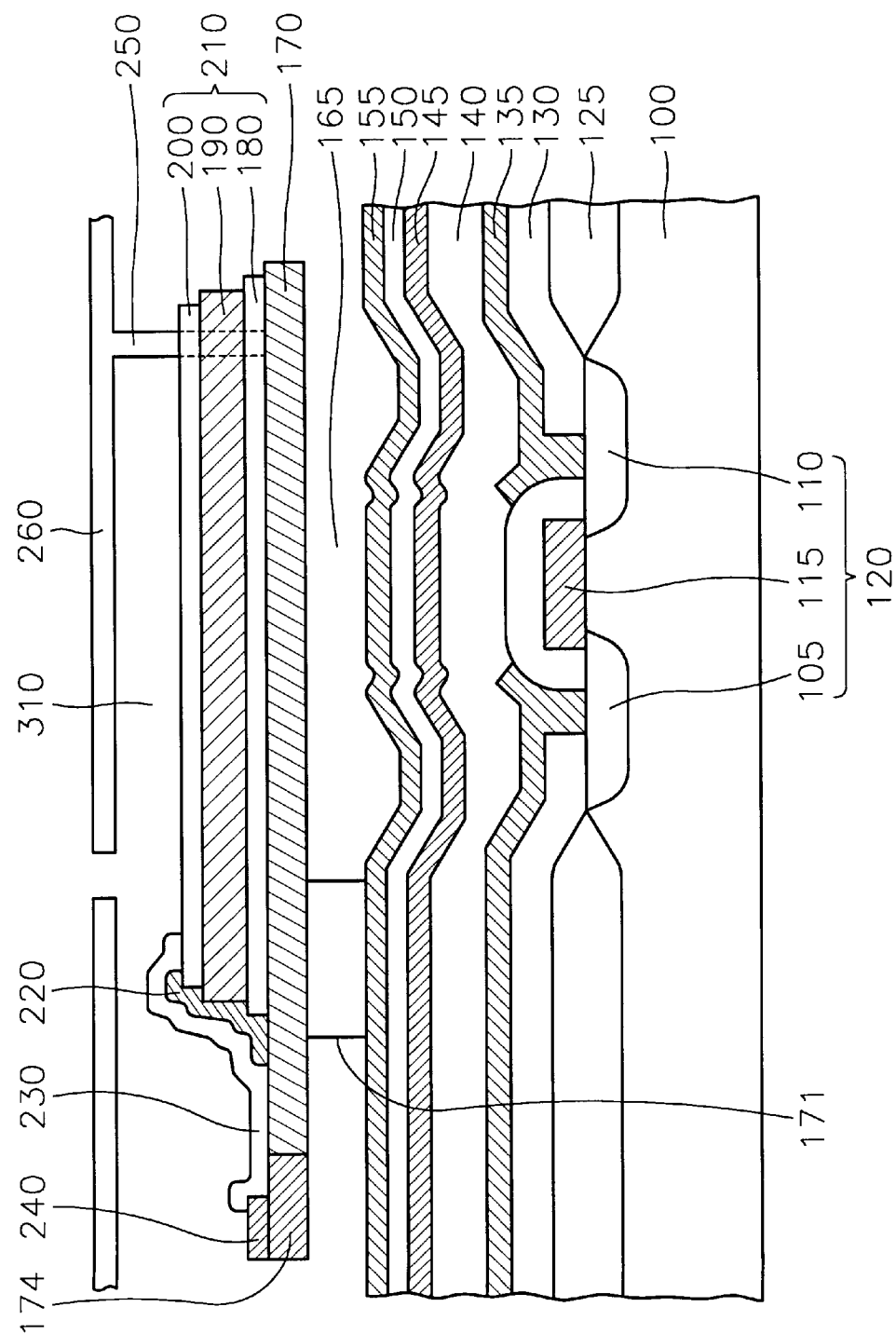
FIG. 8 is a cross-sectional view taken along line $B_1-B_2$ of FIG. 7.
Figure 9:
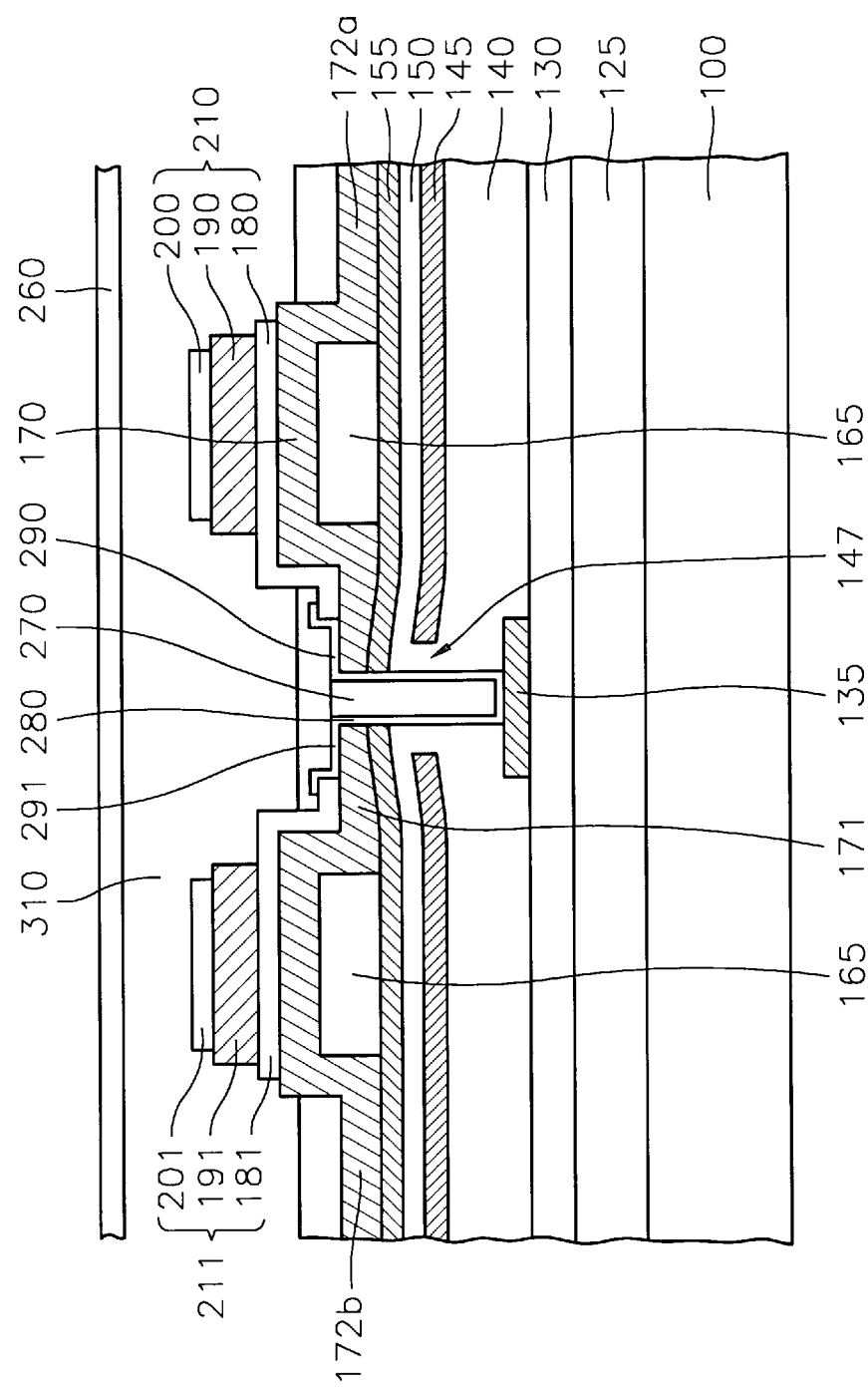
FIG. 9 is a cross-sectional view taken along line $C_1-C_2$ of FIG. 7.

FIG. 6 is a plan view for showing a thin film actuated mirror array in an optical projection system according to the present invention, FIG. 7 is a perspective view for showing the thin film actuated mirror array in FIG. 6, FIG. 8 is a cross-sectional view taken along line $B_1$–$B_2$ of FIG. 7, and FIG. 9 is a cross-sectional view taken along line $C_1$–$C_2$ of FIG. 7.

Referring to FIGS. 6 and 7, the thin film AMA according to the present invention has an active matrix 100, a supporting member 175 formed on the active matrix 100, a first actuating part 210 and a second actuating part 211 respectively formed on the supporting member 175, and a reflecting member 260 formed above the first actuating part 210 and above the second actuating part 211.

Referring to FIG. 8, the active matrix 100 has a substrate 101 including M×N (M, N are integers) numbers of P-MOS transistors 120, a first metal layer 135 prolonged from a source 110 and from a drain 105 of the P-MOS transistor 120, a first passivation layer 140, a second metal layer 145, a second passivation layer 150, and an etching stop layer 155. The first metal layer 135 is formed on the substrate 101 and the first passivation layer 140 is formed on the first metal layer 135 and on the substrate 101. The second metal layer 145 is formed on the first passivation layer 140 and the second passivation layer 150 is formed on the second metal layer 145. The etching stop layer 155 is formed on the second passivation layer 150.

The first metal layer 135 has a drain pad prolonged from the drain 105 of the P-MOS transistor 120 to a first anchor 171 which is formed beneath and between the first actuating part 210 and the second actuating part 211. The second metal layer 145 includes a titanium layer and a titanium nitride layer. A hole 147 is formed at a portion of the second metal layer 145 having the drain pad of the first metal layer 135 formed thereunder.

Referring to FIGS. 6 to 9, the supporting member 175 has a supporting line 174, a supporting layer 170, the first anchor 171 and two second anchors 172a, 172b. The supporting line 174 and the supporting layer 170 are formed above the etching stop layer 155. A first air gap 165 is interposed between the etching stop layer 155 and the supporting line 174. The first air gap 165 is also interposed between the etching stop layer 155 and the supporting layer 170.

A common line 240 is formed on the supporting line 174. The supporting line 174 plays a role of supporting the common line 240. The supporting layer 170 has a rectangular ring shape. The supporting layer 170 is integrally formed with the supporting line 174.

The first anchor 171 is formed beneath and between two arms of the rectangular ring-shaped supporting layer 170. These two arms of the supporting layer 170 are perpendicularly prolonged from the supporting line 174. The first anchor 171 is attached to a first portion of the etching stop layer 155 having the drain pad of the first metal layer 135 formed thereunder. The first anchor 171 is integrally formed with those two arms of the supporting layer 170. The two second anchors 172a, 172b are respectively formed beneath outsides of those two arms of the supporting layer 170. The second anchors 172a, 172b are also integrally formed with those two arms of the supporting layer 170. The second anchors 172a, 172b are respectively attached to a second portion of the etching stop layer 155 and to a third portion of the etching stop layer 155. The first anchor 171 and the two second anchors 172a, 172b are attached beneath portions of the supporting layer 170 which are adjacent to the supporting line 174. The first anchor 171 and the second anchors 172a, 172b together support the supporting layer 170, so the first anchor 171 and the second anchors 172a, 172b support the first actuating part 210 and the second actuating part 211. The first anchor 171 and the second anchors 172a, 172b respectively have box-shapes.

A central portion of the supporting layer 170 is supported by the first anchor 171 and lateral portions of the supporting layer 170 are supported by the second anchors 172a, 172b. Therefore, a vertical section of the supporting member 175 has a T shape as shown in FIG. 8.

A via hole 270 is formed from the surface of a central portion of the first anchor 171 to the drain pad of the first metal layer 135 through portions of the etching stop layer 155, the second passivation layer 150, the hole 147 of the second metal layer 145 and the first passivation layer 140. A via contact 280 is formed in the via hole 270.

The first actuating part 210 and the second actuating part 211 are respectively formed on those two arms of the supporting layer 170. The first actuating part 210 and the second actuating part 211 are formed parallel to each other. The first actuating part 210 has a first bottom electrode 180, a first active layer 190 and a first top electrode 200. The second actuating part 211 has a second bottom electrode 181, a second active layer 191 and a second top electrode 201.

The first bottom electrode 180 is formed on one of those two arms of the supporting layer 170. The first bottom electrode 180 has a rectangular shape including a protruding portion, preferably, the first bottom electrode 180 has an inversed L shape. The first bottom electrode 180 is apart from the supporting line 174 by a predetermined interval. The protruding portion of the first bottom electrode 180 is prolonged downward like a stair. The protruding portion of the first bottom electrode 180 is prolonged to a portion of the first anchor 171 adjacent to the via hole 270. The first active layer 190 is formed on the first bottom electrode 180. The first active layer 190 has a rectangular shape which is smaller than the first bottom electrode 180. The first top electrode 200 is formed on the first active layer 190. The first top electrode 200 has a rectangular shape which is smaller than the first active layer 190.

The second bottom electrode 181 is formed on the other of the two arms of the supporting layer 170. The second bottom electrode 181 has a rectangular shape having a protruding portion, preferably, the second bottom electrode 181 has an L shape which is corresponding to the first bottom electrode 180. The second bottom electrode 181 is also apart from the supporting line 174 by a predetermined interval. The protruding portion of the second bottom electrode 181 is prolonged to a portion of the first anchor 171 adjacent to the via hole 270 like the protruding portion of the first bottom electrode 180. Hence, these protruding portions of the first and the second bottom electrodes 180, 181 are correspondingly formed centering around the via hole 270. The second active layer 191 is formed on the second bottom electrode 181. The second active layer 191 has a rectangular shape which is smaller than the second bottom electrode 181. The second top electrode 201 is formed on the second active layer 191. The second top electrode 201 has a rectangular shape which is smaller than the second active layer 191.

The via contact 280 is formed from the drain pad of the first metal layer 135 to the top of the via hole 270. A first bottom electrode connecting member 290 is formed from the via contact 280 to the protruding portion of the first bottom electrode 180. The first bottom electrode 180 is connected to the drain pad of the first metal layer 135 through the via contact 280 and the first bottom electrode connecting member 290. Also, a second bottom electrode connecting member 291 is formed from the via contact 280 to the protruding portion of the second bottom electrode 181. The second bottom electrode 181 is connected to the drain pad of the first metal layer 135 through the via contact 280 and the second bottom electrode connecting member 291.

A first insulating member 220 is formed from a portion of the first top electrode 200 to a portion of the supporting layer 170 which is adjacent the supporting line 174. A first top electrode connecting member 230 is formed a portion of the first top electrode 200 to the common line 240 via the first insulating member 220. The first top electrode connecting member 230 connects the first top electrode 200 to the common line 240. The first insulating member 220 prevents the first top electrode 200 from connecting to the first bottom electrode 180, so the first insulating member 220 prevents an electrical short from generating between the first top electrode 200 and the first bottom electrode 180.

Also, a second insulating member 221 is formed from a portion of the second top electrode 201 to a portion of the supporting layer 170 which is adjacent the supporting line 174. A second top electrode connecting member 231 is formed a portion of the second top electrode 201 to the common line 240 via the second insulating member 221. The second top electrode connecting member 231 connects the second top electrode 201 to the common line 240. The second insulating member 221 and the second top electrode connecting member 231 are respectively formed parallel to the first insulating layer 220 and the first top electrode connecting member 230. The second insulating member 221 prevents the second top electrode 201 from connecting to the second bottom electrode 181, so the second insulating member 221 prevents an electrical short from generating between the second top electrode 201 and the second bottom electrode 181.

The post 250 is formed at a portion of the supporting layer 170 having the rectangular ring shape at which the first actuating part 210 and the second actuating part 211 aren't formed (That is, a portion of the supporting layer 170 is apart in parallel direction to the supporting line 174). The post 250 supports the reflecting member 260. Preferably, the reflecting member 260 has a rectangular shape.

The central portion of the reflecting member 260 is supported by the post 250. The lateral portions of the reflecting member 260 are parallely formed above the first actuating part 210 and above the second actuating part 211. A second air gap 310 is interposed between those lateral portions of the reflecting member 260 and the first and the second actuating parts 210, 211. The reflecting member 260 is tilted according as the first actuating part 210 and the second actuating part 211 are actuated, so the reflecting member 260 reflects the incident light from a light source (not shown) by a predetermined angle.

A method for manufacturing the thin film AMA in an optical projection system according to the present invention will be described as follows.

FIGS. 10A to 10G illustrate manufacturing steps of the thin film AMA according to the present invention. In FIGS. 10A to 10G, the same reference numerals are used for the same elements in FIG. 7.

Figure 10A:
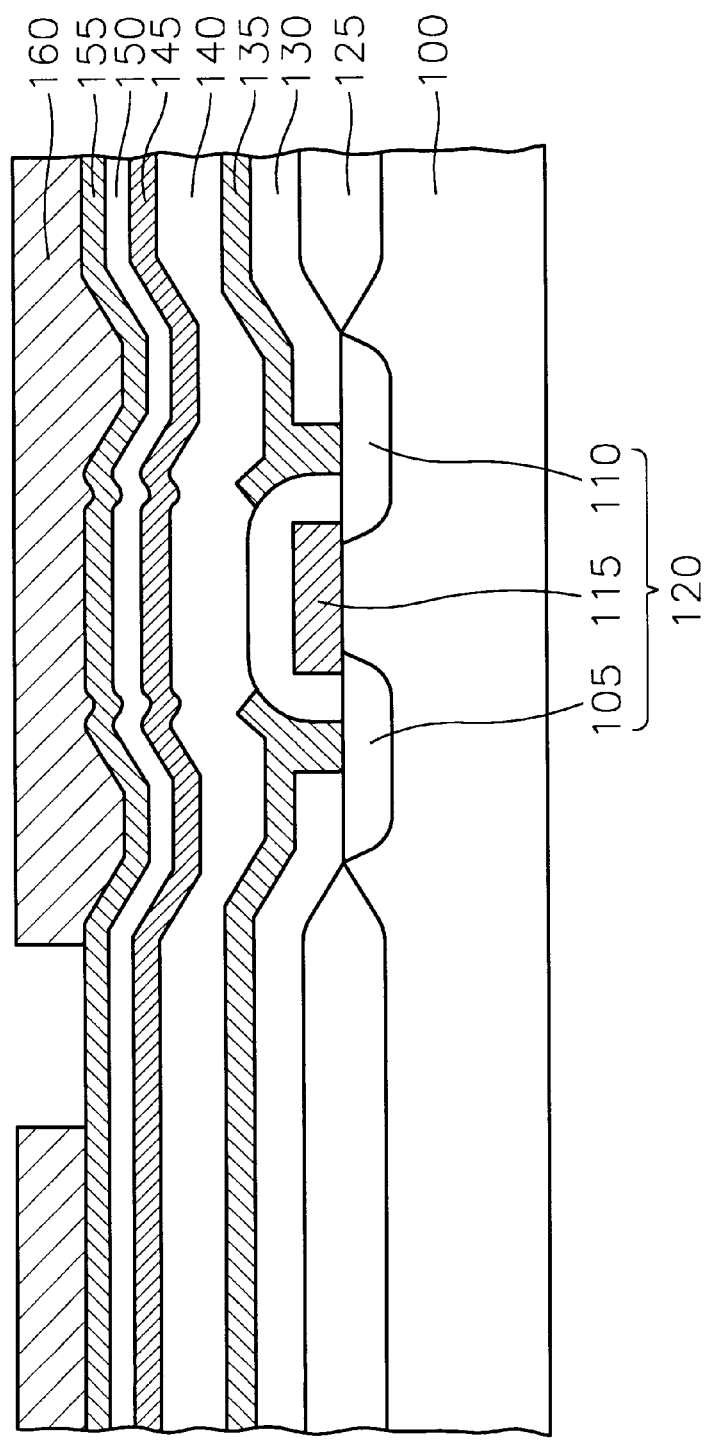

Referring to FIG. 10A, an isolating layer 125 is formed on the substrate 101 in order to separate an active region and a field region in the substrate 101 by local oxidation of silicon method after the substrate 101 composed of silicon is provided. Preferably, the substrate 101 is an N-typed silicon wafer. Subsequently, M×N (M, N are integers) numbers of P-typed metal oxide semiconductor (MOS) transistors 120 are completed according as the $P^+$ source 110 and the $P^+$ drain 105 are formed on the active region after a gate 115 is formed between the source 110 and the drain 105. The P-MOS transistor 120 receives a first signal (picture signal) from outside and performs a switching operation.

After an insulating layer 130 is formed on the substrate 101 having the P-MOS transistor 120 formed therein, openings are respectively formed at portions of the insulating layer 130 having drain 105 and the source 110 formed thereunder so as to expose the portions of the drain 105 and the source 110. After a layer composed of titanium (Ti), titanium nitride (TiN), tungsten (W) and nitride is formed on the insulating layer 130 having the openings, the layer is patterned to form the first metal layer 135. To transmit the first signal, the first metal layer 135 has a drain pad prolonged from the drain 105 of the P-MOS transistor 120 to the first anchor which will be formed later.

The first passivation layer 140 is formed on the first metal layer 135 and on the substrate 101. The first passivation layer 140 is formed by using phosphor-silicate glass (PSG). The first passivation layer 140 is formed by chemical vapor deposition (CVD) method so that the first passivation layer 140 has a thickness of between about 8000 521 and 9000 Å. The first passivation layer 140 protects the substrate 101 having the P-MOS transistor 120 during subsequent manufacturing steps.

The second metal layer 145 is formed on the first passivation layer 140. The second metal layer 145 is composed of the titanium layer and the titanium nitride layer. For forming the second metal layer 145, at first, the titanium layer is formed on the first passivation layer 140 by sputtering method so that the titanium layer has a thickness of between about 300 Å and 500 Å. Next, the titanium nitride layer is formed on the titanium layer by physical vapor deposition (PVD) method so that the titanium nitride layer has a thickness of between about 1000 Å and 1200 Å. The second metal layer 145 excludes the light incident upon the substrate 101, so the second metal layer 145 prevents a photo leakage current from flowing through the substrate 101. Then, a portion of the second metal layer 145 having the drain pad formed thereunder is etched so as to form the hole 147. The hole 147 isolates the via contact 280 from the second metal layer 145.

The second passivation layer 150 is formed on the second metal layer 145 and on the hole 147. The second passivation layer 150 is formed by using phosphor-silicate glass. The second passivation layer 150 is formed by CVD method so that the second passivation layer 150 has a thickness of between about 2000 Å and 3000 Å. The second passivation layer 150 protects the second metal layer 145 and the resultant layers formed on the substrate 101 during subsequent manufacturing steps.

The etching stop layer 155 is formed on the second passivation layer 150 by using low temperature oxide (LTO) such as silicon dioxide ($SiO_2$) or phosphorus pentoxide ($P_2O_5$). The etching stop layer 155 is formed by low pressure CVD (LPCVD) method under a temperature of between about 350° C. and 450° C. so that the etching stop layer 155 has a thickness of between about 0.2 μm and 0.8 μm. The etching stop layer 155 protects the second passivation layer 150 and the resultant layers formed on the substrate 101 during subsequent etching steps. As a result, the active matrix 100 is completed, which is composed of the substrate 101, the first metal layer 135, the first passivation layer 140, the second metal layer 145, the second passivation layer 150 and the etching stop layer 155.

A first sacrificial layer 160 is formed on the etching stop layer 155 by using poly silicon below a temperature of about 500° C. The first sacrificial layer 160 is formed by LPCVD method so that the first sacrificial layer 160 has a thickness of between about 2.0 μm and 3.0 μm. In this case, the degree of flatness of the first sacrificial layer 160 is poor because the first sacrificial layer 160 covers the top of the active matrix 100 having the MOS transistor 120 and the resultant layers. Therefore, the surface of the first sacrificial layer 160 is planarized by using spin on glass (SOG) or by chemical mechanical polishing (CMP) method so that the first sacrificial layer 160 has a thickness of about 1.1 μm.

Figure 10B:
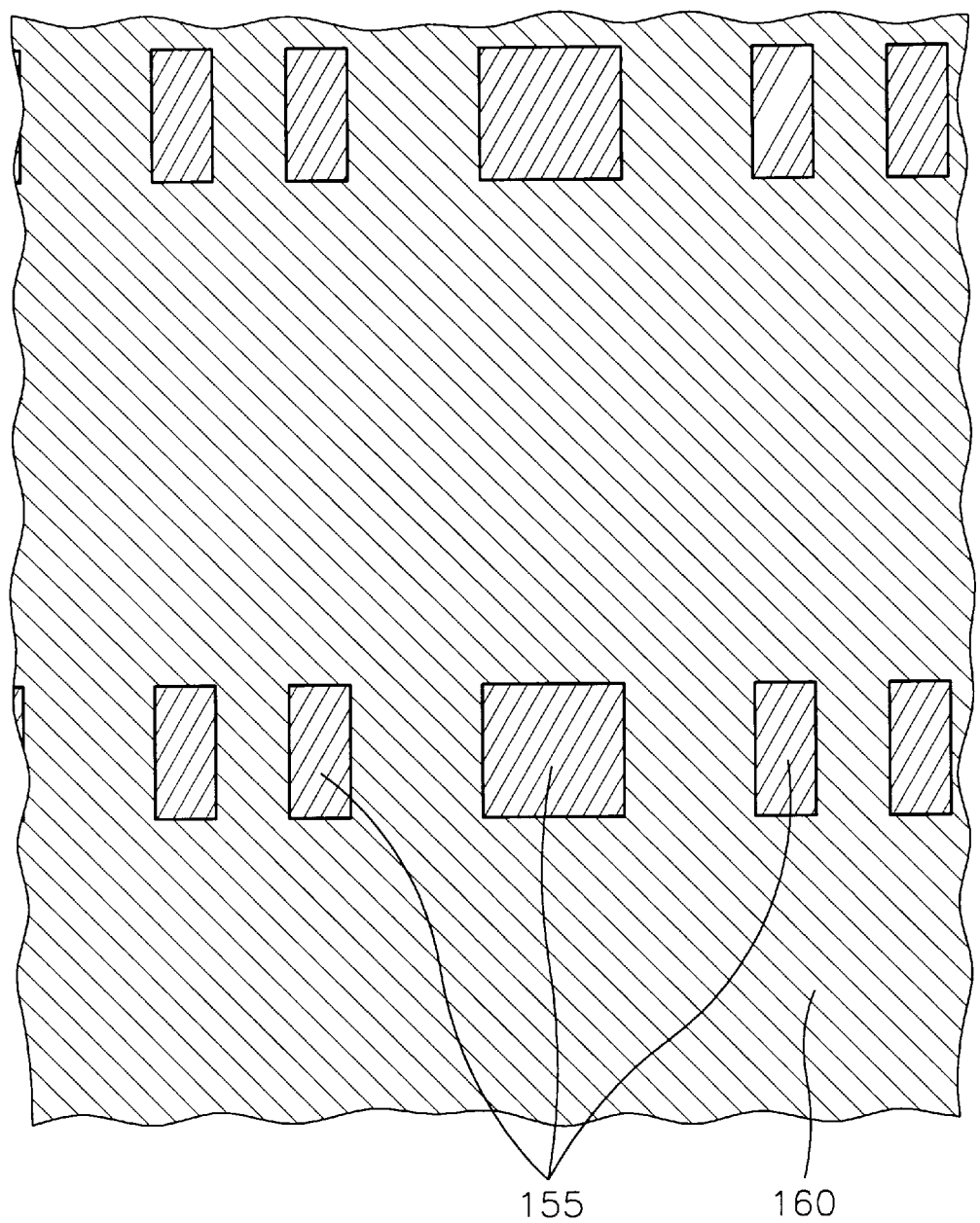

FIG. 10B illustrates a plan view for showing the patterned first sacrificial layer 160.

Referring to FIGS. 10A and 10B, after a first photo resist (not shown) is coated on the first sacrificial layer 160 and is patterned, a first portion of the first sacrificial layer 160 having the hole 147 of the second metal layer 145 formed thereunder and a second and a third portions of the first sacrificial layer 160 adjacent to the first portion are etched to expose portions of the etching stop layer 155. The first anchor and the second anchors will be formed at the exposed portions of the etching stop layer 155. These exposed portions of the etching stop layer 155 respectively have rectangular shapes which are separated by predetermined intervals. Then, the first photo resist is removed.

Referring to FIG. 10C, a first layer 169 is formed on those exposed portions of the etching stop layer 155 which have rectangular shapes and on the first sacrificial layer 160. The first layer 169 is formed by using a rigid material such as nitride or metal. The first layer 169 is formed by LPCVD method so that the first layer 169 has a thickness of between about 0.1 μm and 1.0 μm. The first layer 169 will be patterned so as to form the supporting member having the supporting layer, the supporting line, the first anchor and the two second anchors. At that time, the first anchor locates at the center of the exposed portions of the etching stop layer 155 and the two second anchors respectively locate at other exposed portions of the etching stop layer 155.

A bottom electrode layer 179 is formed on the first layer 169. The bottom electrode layer 179 is formed by using electrically conductive metal such as platinum (Pt), tantalum (Ta) or platinum-tantalum (Pt—Ta). The bottom electrode layer 179 is formed by sputtering method or CVD method so that the bottom electrode layer 179 has a thickness of between about 0.1 μm and 1.0 μm. The bottom electrode layer 179 will be patterned to form the first bottom electrode 180 and the second bottom electrode 181 respectively having the protruding portions which are opposed to each other.

A second layer 189 is formed on the bottom electrode layer 179. The second layer 189 is formed by using piezoelectric material such as PZT (Pb(Zr, Ti)O$_3$) or PLZT ((Pb, La)(Zr, Ti)O$_3$) and by sol-gel method, sputtering method or CVD method so that the second layer 189 has a thickness of between about 0.1 μm and 1.0 μm. Preferably, the second layer 189 is formed by the sputtering method and by using the PZT produced according to the sol-gel method so that the second layer 189 has a thickness of about 0.4 μm. Then, the second layer 189 is annealed by rapid thermal annealing (RTA) method. The second layer 189 will be patterned to form the first active layer and the second active layer 191 which are respectively deformed by the first electric field and the second electric field.

A top electrode layer 199 is formed on the second layer 189. The top electrode layer 199 is formed by using an electrically conductive metal, for example, tantalum, platinum or silver (Ag). The top electrode layer 199 is formed by sputtering method or CVD method so that the top electrode layer 199 has a thickness of between about 0.1 μm and 1.0 μm. The top electrode layer 199 will be patterned so as to form the first top electrode and the second top electrode which are separated by a predetermined interval.

Referring to FIG. 10D, after a second photo resist (not shown) is coated on the top electrode layer 199 by spin coating method, the top electrode layer 199 is patterned so as to form the first top electrode 200 and the second top electrode 201 which are respectively have rectangular shapes (see FIG. 7) by using the second photo resist as an etching mask. The first top electrode 200 and the second top electrode 201 are formed parallel to each other. A second signal (a bias signal) is applied to the first top electrode 200 and to the second top electrode 201 through the common line 240. Then, the second photo resist is removed.

The second layer 189 is patterned to form the first active layer 190 and the second active layer 191 by the same process of the top electrode layer 199. The first active layer 190 and the second active layer 191 are also formed parallel to each other. In this case, the first active layer 190 and the second active layer 191 respectively have rectangular shapes which are wider than the first top electrode 200 and the second top electrode 201 as shown in FIG. 7.

The bottom electrode layer 179 is patterned to form the first bottom electrode 180 and the second bottom electrode 181 by the same method of the top electrode layer 199. The first bottom electrode 180 and the second bottom electrode 181 respectively have the rectangular shapes which correspondingly have the protruding portions. Preferably, the first bottom electrode 180 has the inversed L shape and the second bottom electrode 181 has the L shape which is corresponded to the first bottom electrode 180. The first bottom electrode 180 and the second bottom electrode 181 are respectively wider than the first active layer 190 and the second active layer 191.

When the first bottom electrode 180 and the second bottom electrode 181 are formed, the common line 240 is simultaneously formed at a portion of the first layer 169 which will be patterned to form the supporting line 174. The common line 240 is formed in the direction perpendicular to the first bottom electrode 180 and the second bottom electrode 181 as shown in FIG. 7. The common line 240 is separated from the first and the second bottom electrodes 180, 181 by a predetermined interval, so the common line 240 not to contact with the first bottom electrode 180 and with the second bottom electrode 181. As a result, the first actuating part 210 and the second actuating part 211 are completed. The first actuating part 210 has the first bottom electrode 180, the first active layer 190 and the first top electrode 200, and the second actuating part 211 has the second bottom electrode 181, the second active layer 191 and the second top electrode 201.

Subsequently, the first layer 169 is patterned to form the supporting member 175 having the supporting layer 170, the supporting line 174, the first anchor 171 and the two second anchors 172a, 172b. In this case, among the first layer 169 attached to the exposed portions of the etching stop layer 155, the first anchor 171 locates on the center of the exposed portion of the etching stop layer 155 and the two second anchors 172a, 172b respectively locate on the others of the exposed portions of the etching stop layer 155. The hole 147 of the second metal layer 145 is formed under the first anchor 171. The supporting layer 170 has the rectangular ring shape and is integrally formed with the supporting line 174 which is formed above the etching stop layer 155. The supporting member 175 is completed as shown in FIG. 7 when the first sacrificial layer 160 is removed.

The first anchor 171 is formed beneath and between the two arms of the rectangular ring-shaped supporting layer 170. The two arms of the supporting layer 170 are perpendicularly prolonged from the supporting line 174. The first anchor 171 is attached to the center of the exposed portion of the etching stop layer 155, that is a first exposed portion of the etching stop layer 155, having the drain pad of the first metal layer 135 formed thereunder. The first anchor 171 is integrally formed with the two arms of the supporting layer 170. The two second anchors 172a, 172b are respectively formed beneath outsides of the two arms of the supporting layer 170. The second anchors 172a, 172b are also integrally formed with the two arms of the supporting layer 170 and are respectively attached to a second and a third exposed portions of the etching stop layer 155. The first anchor 171 and the second anchors 172a, 172b are attached beneath the portions of the supporting layer 170 adjacent to the supporting line 174. The first actuating part 210 and the second actuating part 211 are respectively formed on the two arms of the supporting layer 170. Hence, the first anchor 171 is formed beneath and between the first actuating part 210 and the second actuating part 211 and the second anchors 172a, 172b are respectively formed beneath outsides of the first and the second actuating parts 210, 211. The first anchor 171 and the second anchors 172a, 172b together support the supporting layer 170, so the first anchor 171 and the second anchors 172a, 172b respectively support the first actuating part 210 and the second actuating part 211.

Referring to FIG. 10E, after a third photo resist (not shown) is coated on the supporting member 175, on the first actuating part 210 and on the second actuating part 211, the third photo resist is patterned to expose portions of the common line 240, the supporting member 175, the first top electrode 200 and the second top electrode 201 as shown in FIG. 7. At that time, the protruding portions of the first bottom electrode 180 and the second bottom electrode 181 are simultaneously exposed.

Subsequently, the first insulating member 220 and the second insulating member 221 are formed by patterning LTO such as silicon dioxide (SiO$_2$) or phosphorus pentoxide (P$_2$O$_5$), after the LTO is formed on the exposed portions of the supporting member 175, the first top electrode 200 and the second top electrode 201 by LPCVD method. The first insulating member 220 is formed from a portion of the first top electrode 200 to a portion of the supporting layer 170 via portions of the first active layer 190 and the first bottom electrode 180. The second insulating member 221 is also formed from a portion of the second top electrode 200 to a portion of the supporting layer 170 via portions of the second active layer 190 and the second bottom electrode 180. The first insulating member 220 and the second insulating member 221 respectively have thicknesses of between about 0.2 µm and 0.4 µm, preferably, 0.3 µm.

FIG. 10F illustrates a cross-sectional view for showing the via contact 280. Referring to FIGS. 10E and 10F, the via hole 270 is formed from the first anchor 171 to the drain pad of the first metal layer 135 through the hole 147 of the second metal layer 145 by etching portions of the etching stop layer 155, the second passivation layer 150 and the first passivation layer 140. Then, the via contact 280 is formed in the via hole 270. The first bottom electrode connecting member 290 and the second bottom electrode connecting member 291 are respectively formed form the via hole 270 to the protruding portions of the first bottom electrode 180 and the second bottom electrode 181. At the same time, the first top electrode connecting member 230 is formed from the common line 240 to a portion of the first top electrode 200 via the first insulating member 220 and the supporting layer 170. The second top electrode connecting member 231 is also formed from the common line 240 to a portion of the second top electrode 201 via the second insulating member 221 and the supporting layer 170 as shown in FIG. 7. The first top electrode connecting member 230 and the second top electrode connecting member 231 are formed parallel to each other.

The via contact 280, the first bottom electrode connecting member 290, the second bottom electrode connecting member 291, the first top electrode connecting member 230 and the second top electrode connecting member 231 are formed by using electrically conductive metals such as a platinum, tantalum or platinum-tantalum and by sputtering method or CVD method. The via contact 280, the first bottom electrode connecting member 290, the second bottom electrode connecting member 291, the first top electrode connecting member 230 and the second top electrode connecting member 231 are respectively have thicknesses of between about 0.1 µm and 0.2 µm. The first top electrode connecting member 230 and the second top electrode connecting member 231 respectively connect the common line 240 to the first top electrode 200 and to the second top electrode 201. The protruding portion of the first bottom electrode 180 is connected to the drain pad through the via contact 280 and the first bottom electrode connecting member 290. The protruding portion of the second bottom electrode 181 is connected to the drain pad through the via contact 280 and the second bottom electrode connecting member 291, too.

Figure 10G:
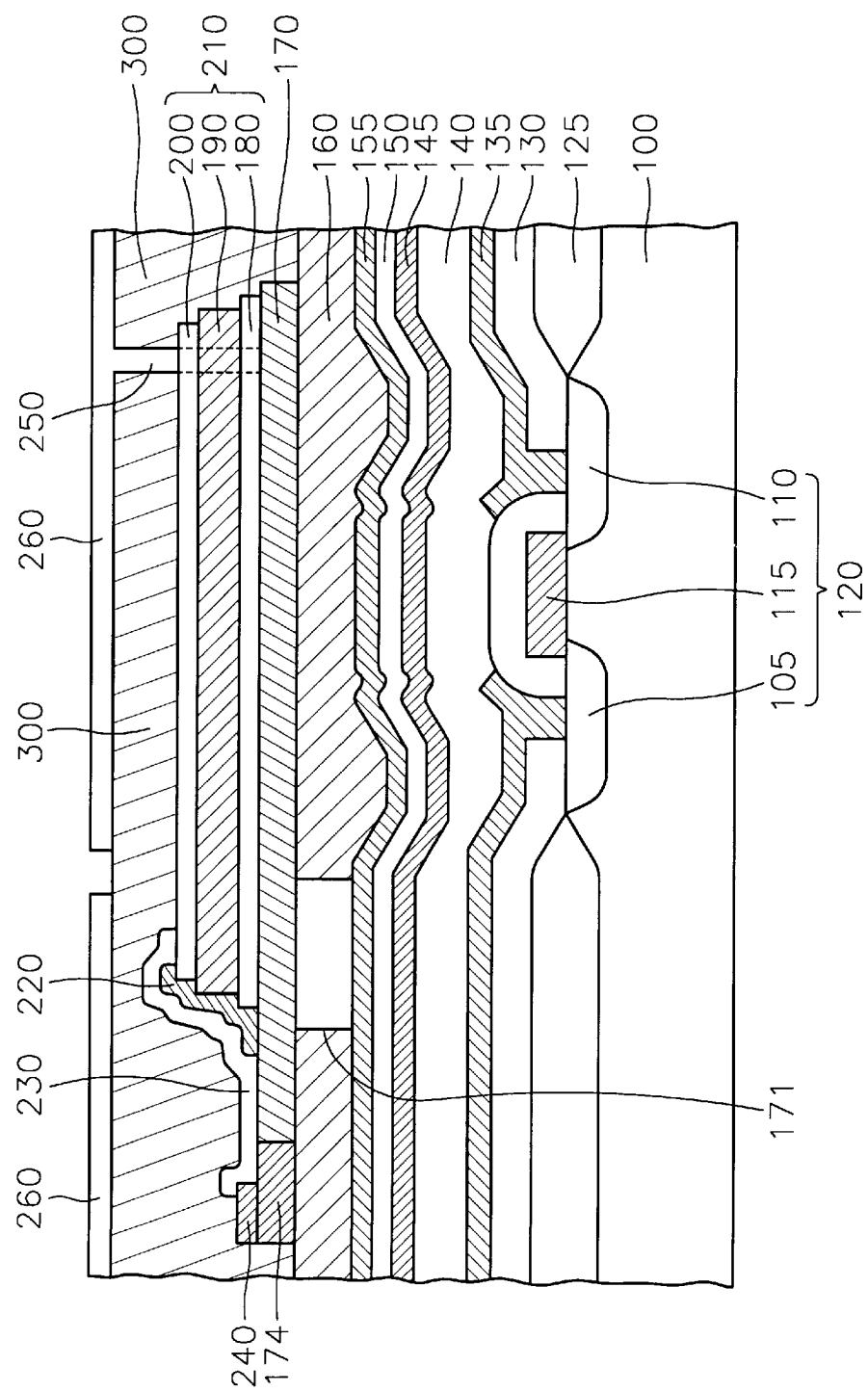

Referring to FIG. 10G, a second sacrificial layer 300 is formed on the first actuating part 210, on the second actuating part 211 and on the supporting member 175. The second sacrificial layer 300 is formed by using poly silicon and by LPCVD method. The second sacrificial layer 300 sufficiently covers the first actuating part 210 and the second actuating part 211. Then, the surface of the second sacrificial layer 300 is planarized by CMP method so as to the second sacrificial layer 300 has an even surface.

Subsequently, for forming the reflecting member 260 and the post 250, a portion of the second sacrificial layer 300 is etched to expose a portion of the supporting layer 170 which is apart in parallel direction to the supporting line 174. Namely, the portion of the supporting layer 170 where the first actuating part 210 and the second actuating part 211 are not formed is exposed. The post 250 and the reflecting member 260 are simultaneously formed by patterning a metal layer having reflectively after the metal layer is formed on the exposed portion of the supporting layer 170 and on the sacrificial layer 300. The post 250 and the reflecting member 260 are formed by using aluminum and by sputtering method or CVD method. The central portion of the reflecting member 260 is supported by the post 250 and lateral portions of the reflecting member 260 are parallely formed above the first actuating part 210 and above the second actuating part 211 as shown in FIG. 7. Preferably, the reflecting member 260 has a rectangular shape.

Therefore, the thin film AMA shown in FIG. 7 is complete by rinsing and drying after the first sacrificial layer 160 and the second sacrificial layer 300 are removed by using bromine fluoride (BrF$_3$ or BrF$_5$) vapor or xenon fluoride (XeF$_2$, XeF$_4$ or XeF$_6$) vapor. A second air gap 310 is formed at the position where the second sacrificial layer 300 is located and the first air gap 165 is formed at the position where the first sacrificial layer 160 is located.

The operation of the thin film AMA in an optical projection system according to the present invention will be described.

In the thin film AMA according to the present invention, the first signal is applied from outside to the first and the second bottom electrodes 180, 181 via the MOS transistor 120 installed in the substrate 101, the drain pad of the first metal layer 135, the via contact 280, and the first and the second bottom electrode connecting members 290, 291. At the same time, the second signal is applied from outside to the first and the second top electrodes 200, 201 via the common line 240 and the first and the second top electrode connecting members 230, 231. Thus, the first electric field is generated between the first top electrode 200 and the first bottom electrode 180 and the second electric field is generated between the second top electrode 201 and the second bottom electrode 181. The first active layer 190 formed between the first top electrode 200 and the first bottom electrode 180 is deformed by the first electric field and the second active layer 191 formed between the second top electrode 201 and the second bottom electrode 181 is deformed by the second electric field. The first and the second active layers 190, 191 are respectively deformed in the directions perpendicular to the first and the second electric fields. The first actuating part 210 having the first active layer 190 and the second actuating part 211 having the second active layer 191 are actuated in the opponent direction to the position where the supporting layer 170 is located. That is, the first and the second actuating parts 210, 211 are actuated upward and the supporting layer 170 attached to the first and the second bottom electrodes 180, 181 is also actuated upward according to the actuatings of the first and the second actuating parts 210, 211.

The reflecting member 260 is supported by the post 250 which is formed on the portion of the supporting layer 170. The reflecting member 260 reflecting the incident light from the light source is tilted with the first and the second actuating parts 210, 211. Hence, the reflecting member 260 reflects the light onto the screen, so the picture is projected on the screen.

In the thin film actuated mirror array in an optical projection system according to the present invention, the supporting member has the supporting line, the supporting layer having the rectangular ring shape, the first anchor and the second anchors. The first and the second actuating parts are respectively formed two arms of the rectangular ring shaped supporting layer. The anchors supporting the actuating parts are formed in perpendicular direction to the actuating parts. The actuating parts have level surfaces without initial tiltings because the stress concentration line does not generated between the anchors and the actuating parts. Thus, the desired reflection angle of the reflecting member formed on the actuating parts may be regular, so the light efficiency is enhanced and the quality of the picture projected onto the screen is increased.

Also, electrical shorts generated between the top electrodes and the bottom electrodes may be prevented by the insulating members. Therefore, point defects of the pixels in the thin film AMA are effectively decreased.

Although preferred embodiment of the present invention have been described, it is understood that the present invention should not be limited to this preferred embodiment, but various changes and modifications can be made by one skilled in the art within the spirit and scope of the invention as hereinafter claimed.

What is claimed is:

1. A thin film actuated mirror array in an optical projection system being actuated by a first signal and a second signal, said thin film actuated mirror array comprising:

an active matrix having a substrate having a metal oxide semiconductor transistor installed therein for switching operation and a first metal layer having a drain pad prolonged from a drain of the metal oxide semiconductor for transmitting the first signal;

a supporting means having 1) a supporting line formed above said active matrix, 2) a supporting layer having a rectangular ring shape, said supporting layer being integrally formed with said supporting line, and 3) a first anchor and two second anchors respectively formed between said active matrix and portions of said supporting layer adjacent to said supporting line;

a first actuating part having a) a first bottom electrode for receiving the first signal, said first bottom electrode being formed at a first portion of said supporting layer which is formed perpendicular to said supporting line, b) a first top electrode corresponding to said first bottom electrode for receiving the second signal and generating a first electric field, and c) a first active layer formed between said first bottom electrode and said first top electrode and deformed by the first electric field;

a second actuating part having i) a second bottom electrode for receiving the first signal, said second bottom electrode being formed at a second portion of said supporting layer which is formed perpendicular to said supporting line, ii) a second top electrode corresponding to said second bottom electrode for receiving the second signal and generating a second electric field, and iii) a second active layer formed between said second bottom electrode and said second top electrode and deformed by the second electric field; and a reflecting means for reflecting a light, said reflecting means being formed above said first actuating part and said second actuating part.

2. The thin film actuated mirror array in an optical projection system as claimed in claim 1, said active matrix further comprising:

a first passivation layer formed on said first metal layer and on said substrate;

a second metal layer formed on said first passivation layer;

a second passivation layer formed on said second metal layer; and an etching stop layer formed on said second passivation layer.

3. The thin film actuated mirror array in an optical projection system as claimed in claim 1, wherein said first bottom electrode has a rectangular shape having a protruding portion, said first active layer has a rectangular shape smaller than said first bottom electrode, said first top electrode has a rectangular shape smaller than said first active layer, said second bottom electrode has a rectangular shape having a protruding portion corresponding to the protruding portion of said first bottom electrode, said second active layer has a rectangular shape smaller than said second bottom electrode, and said second top electrode has a rectangular shape smaller than said second active layer.

4. The thin film actuated mirror array in an optical projection system as claimed in claim 3, wherein said first bottom electrode has an inversed L shape and said second bottom electrode has an L shape corresponding to said first bottom electrode.

5. The thin film actuated mirror array in an optical projection system as claimed in claim 3, wherein said first anchor is formed beneath and between said first actuating part and said second actuating part and is attached to a first portion of said active matrix where the drain pad is formed, and said second anchors are respectively formed beneath outsides of said first actuating part and said second actuating part and are respectively attached to a second portion and a third portion of said active matrix which are adjacent to the first portion of said active matrix.

6. The thin film actuated mirror array in an optical projection system as claimed in claim 5, said thin film actuated mirror array further comprising:

a via contact for transmitting the first signal from the drain pad to said first bottom electrode and to said second bottom electrode, said via contact being formed in a via hole which is formed from said first anchor to the drain pad;

a first bottom electrode connecting means formed from said via contact to the protruding portion of said first bottom electrode; and a second bottom electrode connecting means formed from said via contact to the protruding portion of said second bottom electrode.

7. The thin film actuated mirror array in an optical projection system as claimed in claim 6, wherein said via contact, said first bottom electrode connecting means, and said second bottom electrode connecting means are formed by using an electrically conductive metal such as silver, platinum, tantalum or platinum-tantalum.

8. The thin film actuated mirror array in an optical projection system as claimed in claim 1, said thin film actuated mirror array further comprising:

a common line for transmitting the second signal, said common line being formed on said supporting line;

a first insulating means formed from a portion of said first top electrode to a portion of said supporting layer via a portion of said first bottom electrode;

a first top electrode connecting means formed from said common line to said first top electrode via said first insulating layer;

a second insulating means formed from a portion of said second top electrode to a portion of said supporting layer via a portion of said second bottom electrode; and a second top electrode connecting means formed from said common line to said second top electrode via said second insulating layer.

9. The thin film actuated mirror array in an optical projection system as claimed in claim 8, wherein said first insulating means and said second insulating means are formed by using an amorphous silicon.

10. The thin film actuated mirror array in an optical projection system as claimed in claim 8, wherein said first insulating means and said second insulating means are formed by using a low temperature oxide.

11. The thin film actuated mirror array in an optical projection system as claimed in claim 10, wherein said first insulating means and said second insulating means are formed by using a silicon dioxide ($SiO_2$) or a phosphorus pentoxide ($P_2O_5$).

12. The thin film actuated mirror array in an optical projection system as claimed in claim 8, wherein said first top electrode connecting means and said second top electrode connecting means are formed by using an electrically conductive metal such as silver, platinum, tantalum or platinum-tantalum.

13. The thin film actuated mirror array in an optical projection system as claimed in claim 8, said thin film actuated mirror array further comprising a post for supporting said reflecting means, said post being formed between a central portion of said reflecting means and a portion of said supporting layer which is apart parallel to said supporting line.

14. A thin film actuated mirror array in an optical projection system being actuated by a first signal and a second signal, said thin film actuated mirror array comprising:

an active matrix having a substrate having a metal oxide semiconductor transistor installed therein for switching operation and a first metal layer having a drain pad prolonged from a drain of the metal oxide semiconductor for transmitting the first signal;

a supporting means having 1) a supporting line formed above said active matrix, 2) a supporting layer having a rectangular ring shape, said supporting layer being integrally formed with said supporting line, and 3) a first anchor and two second anchors respectively formed between said active matrix and portions of said supporting layer adjacent to said supporting line;

a first actuating part having a) a first bottom electrode for receiving the first signal and having a protruding portion, said first bottom electrode being formed at a first portion of said supporting layer which is formed perpendicular to said supporting line, b) a first top electrode corresponding to said first bottom electrode for receiving the second signal and generating a first electric field, and c) a first active layer formed between said first bottom electrode and said first top electrode and deformed by the first electric field;

a second actuating part having i) a second bottom electrode for receiving the first signal and having a protruding portion corresponding to the protruding portion of said first bottom electrode, said second bottom electrode being formed at a second portion of said supporting layer which is formed perpendicular to said supporting line, ii) a second top electrode corresponding to said second bottom electrode for receiving the second signal and generating a second electric field, and iii) a second active layer formed between said second bottom electrode and said second top electrode and deformed by the second electric field;

a common line for transmitting the second signal, said common line being formed on said supporting line;

a first top electrode connecting means formed from said common line to said first top electrode;

a second top electrode connecting means formed from said common line to said second top electrode; and a reflecting means for reflecting a light, said reflecting means being formed above said first actuating part and said second actuating part.

15. The thin film actuated mirror array in an optical projection system as claimed in claim 14, wherein said first anchor is formed beneath and between said first actuating part and said second actuating part and is attached to a first portion of said active matrix where the drain pad is formed, and said second anchors are respectively formed beneath outsides of said first actuating part and said second actuating part and are respectively attached to a second portion and a third portion of said active matrix which are adjacent to the first portion of said active matrix.

16. The thin film actuated mirror array in an optical projection system as claimed in claim 14, said thin film actuated mirror array further comprising:

a via contact for transmitting the first signal from the drain pad to said first bottom electrode and to said second bottom electrode, said via contact being formed in a via hole which is formed from said first anchor to the drain pad;

a first bottom electrode connecting means formed from said via contact to the protruding portion of said first bottom electrode; and a second bottom electrode connecting means formed from said via contact to the protruding portion of said second bottom electrode.

17. The thin film actuated mirror array in an optical projection system as claimed in claim 14, said thin film actuated mirror array further comprising:

a first insulating means formed beneath said first top electrode connecting member from a portion of said first top electrode to a portion of said supporting layer via a portion of said first bottom electrode; and a second insulating means formed beneath said second top electrode connecting means from a portion of said second top electrode to a portion of said supporting layer via a portion of said second bottom electrode.

18. The thin film actuated mirror array in an optical projection system as claimed in claim 17, wherein said first insulating means and said second insulating means are formed by using an amorphous silicon or a low temperature oxide such as a silicon oxide or a phosphorus pentoxide.

19. A thin film actuated mirror array in an optical projection system being actuated by a first signal and a second signal, said thin film actuated mirror array comprising:

an active matrix having a substrate having a metal oxide semiconductor transistor installed therein for switching operation and a first metal layer having a drain pad prolonged from a drain of the metal oxide semiconductor for transmitting the first signal;

a supporting means having 1) a supporting line formed above said active matrix, 2) a supporting layer having a rectangular ring shape, said supporting layer being integrally formed with said supporting line, and 3) a first anchor and two second anchors respectively formed between said active matrix and portions of said supporting layer adjacent to said supporting line;

a first actuating part having a) a first bottom electrode for receiving the first signal and having a protruding portion, said first bottom electrode being formed at a first portion of said supporting layer which is formed perpendicular to said supporting line, b) a first top electrode corresponding to said first bottom electrode for receiving the second signal and generating a first electric field, and c) a first active layer formed between said first bottom electrode and said first top electrode and deformed by the first electric field;

a second actuating part having i) a second bottom electrode for receiving the first signal and having a protruding portion corresponding to the protruding portion of said first bottom electrode, said second bottom electrode being formed at a second portion of said supporting layer which is formed perpendicular to said supporting line, ii) a second top electrode corresponding to said second bottom electrode for receiving the second signal and generating a second electric field, and iii) a second active layer formed between said second bottom electrode and said second top electrode and deformed by the second electric field;

a via contact for transmitting the first signal from the drain pad to said first bottom electrode and to said second bottom electrode, said via contact being formed in a via hole which is formed from said first anchor to the drain pad;

a first bottom electrode connecting means formed from said via contact to the protruding portion of said first bottom electrode;

a second bottom electrode connecting means formed from said via contact to the protruding portion of said second bottom electrode;

a common line for transmitting the second signal, said common line being formed on said supporting line;

a first top electrode connecting means formed from said common line to said first top electrode;

a second top electrode connecting means formed from said common line to said second top electrode; and a reflecting means for reflecting a light, said reflecting means being formed above said first actuating part and said second actuating part.

20. The thin film actuated mirror array in an optical projection system as claimed in claim 19, wherein said first insulating means and said second insulating means are formed by using an amorphous silicon or a low temperature oxide such as a silicon dioxide or a phosphorus pentoxide.

* * * * *